US006612382B2

(12) United States Patent
King

(10) Patent No.: US 6,612,382 B2
(45) Date of Patent: Sep. 2, 2003

(54) ITERATIVE DRILLING SIMULATION PROCESS FOR ENHANCED ECONOMIC DECISION MAKING

(75) Inventor: William W. King, Houston, TX (US)

(73) Assignee: Halliburton Energy Services, Inc., Carrollton, TX (US)

( * ) Notice: Subject to any disclaimer, the term of this patent is extended or adjusted under 35 U.S.C. 154(b) by 133 days.

(21) Appl. No.: 09/820,242

(22) Filed: Mar. 28, 2001

(65) Prior Publication Data

US 2001/0042642 A1 Nov. 22, 2001

Related U.S. Application Data

(63) Continuation-in-part of application No. 09/649,495, filed on Aug. 28, 2000, now Pat. No. 6,408,953, which is a continuation-in-part of application No. 09/192,389, filed on Nov. 13, 1998, now Pat. No. 6,109,368, which is a continuation-in-part of application No. 09/048,360, filed on Mar. 26, 1998, now Pat. No. 6,131,673, which is a continuation-in-part of application No. 08/621,411, filed on Mar. 25, 1996, now Pat. No. 5,794,720.

(51) Int. Cl.[7] ........................... G21B 7/00; G21B 47/00; G06F 19/00
(52) U.S. Cl. ............................................. 175/40; 702/9
(58) Field of Search ......................... 175/40, 39; 702/9; 705/10, 400

(56) References Cited

U.S. PATENT DOCUMENTS

| 3,593,807 A | | 7/1971 | Klima |
| 3,660,649 A | * | 5/1972 | Gilchrist et al. .......... 346/33 R |
| 3,752,966 A | | 8/1973 | Foy, Jr. et al. |
| 3,761,701 A | * | 9/1973 | Wilder et al. ................ 702/9 |
| 3,971,449 A | | 7/1976 | Nylund et al. |
| 4,064,749 A | | 12/1977 | Pittman et al. |
| 4,195,699 A | | 4/1980 | Rogers et al. |

(List continued on next page.)

FOREIGN PATENT DOCUMENTS

| EP | 66 255 A2 | 1/1992 |
| GB | 2 328 966 | 3/1999 |
| GB | 2 343 905 | 5/2000 |
| GB | 2 360 304 | 9/2001 |
| GB | 2 363 144 | 12/2001 |
| GB | 2 363 145 | 12/2001 |
| GB | 2 363 146 | 12/2001 |
| GB | 2 364 083 | 1/2002 |
| GB | 2 365 899 | 2/2002 |
| GB | 2 370 059 | 6/2002 |
| GB | 2 370 060 | 6/2002 |
| GB | 2 371 321 | 7/2002 |
| RU | 470593 | 8/1975 |
| RU | 726295 | 4/1980 |
| RU | 1716112 | 2/1992 |

OTHER PUBLICATIONS

G. Martin Milner and Glen Corser, "Data Processing and Interpretation While Drilling", AADE National Drilling Technical Conference 2001.

Jim O'Hare and Osarumwense O.A. Aigbekaen Jr., "Design Index: A Systematic Method of PDC Drill–Bit Selection", IADC World Drilling 2000.

J Booth and J.M. Cook, "Meeting Future Drilling Planning and Decision Support Requirements: A New Drilling Simulator", SPE/IADC Drilling Conference 2001.

(List continued on next page.)

*Primary Examiner*—Hoang Dang
(74) *Attorney, Agent, or Firm*—Baker Botts L.L.P.

(57) ABSTRACT

An iterative drilling simulation method and system for enhanced economic decision making includes obtaining characteristics of a rock column in a formation to be drilled, specifying characteristics of at least one drilling rig system; and iteratively simulating the drilling of a well bore in the formation. The method and system further produce an economic evaluation factor for each iteration of drilling simulation. Each iteration of drilling simulation is a function of the rock column and the characteristics of the at least one drilling rig system according to a prescribed drilling simulation model.

60 Claims, 8 Drawing Sheets

U.S. PATENT DOCUMENTS

| | | | |
|---|---|---|---|
| 4,354,233 A | 10/1982 | Zhukovsky et al. | |
| 4,407,017 A | 9/1983 | Zhilikov et al. | |
| 4,479,176 A | * 10/1984 | Grimshaw | 700/28 |
| 4,627,276 A | 12/1986 | Burgess et al. | |
| 4,685,329 A | 8/1987 | Burgess | |
| 4,694,686 A | 9/1987 | Fildes et al. | |
| 4,793,421 A | 12/1988 | Jasinski | |
| 4,794,534 A | * 12/1988 | Millheim | 175/40 |
| 4,794,535 A | * 12/1988 | Gray et al. | 702/9 |
| 4,845,628 A | 7/1989 | Gray et al. | |
| 4,875,530 A | 10/1989 | Frink et al. | |
| 4,914,591 A | 4/1990 | Warren et al. | |
| 4,926,686 A | 5/1990 | Fay | |
| 4,981,037 A | 1/1991 | Holbrook et al. | |
| 5,010,789 A | 4/1991 | Brett et al. | |
| 5,012,674 A | 5/1991 | Millheim et al. | |
| 5,216,917 A | 6/1993 | Detournay | |
| 5,282,384 A | 2/1994 | Holbrook | |
| 5,305,836 A | 4/1994 | Holbrook et al. | |
| 5,415,030 A | 5/1995 | Jogi et al. | |
| 5,442,950 A | 8/1995 | Unalmiser et al. | |
| 5,449,047 A | 9/1995 | Schivley, Jr. | |
| 5,458,207 A | 10/1995 | Mattero | |
| 5,704,436 A | 1/1998 | Smith et al. | |
| 5,767,399 A | 6/1998 | Smith et al. | |
| 5,794,720 A | 8/1998 | Smith et al. | |
| 5,965,810 A | 10/1999 | Holbrook | |
| 6,021,859 A | 2/2000 | Tibbitts et al. | |
| 6,026,912 A | 2/2000 | King et al. | |
| 6,109,368 A | 8/2000 | Goldman et al. | |
| 6,155,357 A | 12/2000 | King et al. | |
| 6,233,498 B1 | 5/2001 | King et al. | |
| 6,276,465 B1 | 8/2001 | Cooley et al. | |
| 6,389,360 B1 | * 5/2002 | Alft et al. | 702/9 |
| 6,424,919 B1 | 7/2002 | Moran et al. | |
| 2002/0120401 A1 | * 8/2002 | Macdonald et al. | 702/6 |

OTHER PUBLICATIONS

P.R. Rampersad, G. Hareland and P. Boonyapaluk, "Drilling Optimization Using Drilling Data and Available Technology", Society of Petroleum Engineers, Inc., 1994.

R.K. Bratli, G. Hareland, F. Stene, G.W. Dunsaed and G. Gjelstad, "Drilling Optimization Software Verified in the North Sea", SPE LACPEC Conference, 1997.

K.K. Millheim, "The Role of the Simulator in Drilling Operations", SPE Drilling Engineering, Oct. 1986.

Dr. Alan J. Scott, "On–line Animations of Time Evolving Physical Systems", Depart of Physics, University of Wisconsin–Stout.

E.M. Galle and H.B. Woods, "Best Constant Weight and Rotary Speed For Rotary Rock Bits", pp. 48–73, API Drilling and Production Practice, 1993.

R. Teale, "The Concept of Specific Energy in Rock Drilling", p. 57–63, International Journal of Rock Mechanics, Mining Sciences, vol. 2, 1965, Great Britain.

Howell Word and Marvin Fisbeck, "Drilling Parameters and the Journal Bearing Carbide Bit", pp. 92–93, Drilling—DCW, Jan. 1980, first published Oct. 1979 in Tulsa, Oklahoma.

R.C. Pessier, M.J. Fear, "Quantifying Common Drilling Problems with Mechanical Specific Energy and a Bit–Specific Coefficient of Sliding Friction", pp. 373–388, SPE Paper 24584, published Oct. 1982, Washington, D.C.

Philip Holbrook, Michael Hauck, "Petrophysical–Mechanical Math Model Real–Time Wellsite Poor Pressure/Fracture Gradient Prediction", SPE Pub. No. 16666, published Sep. 1987 in Dallas, Texas.

E.C. Onyia, "Relationships between Formation Strength, Drilling Strength,a nd Electric Log Properties", pp. 605–618, SPE Drilling Enginering, Oct. 1988.

David A. Glowka, "Use of Single Cutter Data in the Analysis of PDC Bit Designs: Part I–Development of a PDC Cutting Force Model", pp. 797–849, JPT, Aug. 1989.

David A. Glowka, "Use of Single–Cutter Data in the Analysis of PDC Bit Designs: Part II–Development of PDC WEAR Computer Code", pp. 850–859, JPT, Aug. 1989.

E. Detournay, P. Defourny, "A Phenomenological Model for the Drilling Action of Drag Bits", pp. 13–23, International Journal of Rock Mechanics, Mineral Sciences and Geomechanical Abstracts, vol. 29, No. 1, 1992, printed in Great Britain.

Joe Kelly, Jr., "Use break–even Analysis to Optimize Bit Runs", pp. 75–79, World Oil, Nov. 1992.

Geir Hareland and L.L. Hoberock, "Use of Drilling Parameters to Predict In–Situ Stress Bounds", pp. 457–471, SPE/IADC 25727, Feb. 1993.

J.P.R. Sparr and L.W. Ledgerwood, Harvey Goodman, R. L. Graff and T.J. Moo, "Formation Compressive Strength Estimates for Predicting Drillability and PDC Bit Selection", pp. 569–578, SPE/IADC 29397, published Feb. 1995, Amsterdam, Netherlands.

R.V. Barragan, O.L.A. Santos and E.E. Maidla, "Optimization of Multiple Bit Runs", pp. 579–589, SPE/IADC 37644, Mar. 4, 1977.

R. K. Bratli, G. Hareland F. Stene, G.W. Dunsaed and G. Gjelstad, "Drilling Optimization Software Verified in the North Sea", 7 pages, SPE 39007, Aug. 1997.

G. Gjelstad, G. Hareland, K.N. Nikolaisen and R.K. Bratli, "The Method of Reducing Drilling Cost More Than 50 Percent", 7 pages, SPE 47342, Jul. 1998.

M.B. Ziaja and J.C. Roegiers, "Lithology Diagnosis Based on the Measurements of Drilling Forces and Moments at the Bit", IADC/SPE 47799, pp. 185–194, Sep. 1998.

H. Xu, T. Hatakeyama, T. Yonezawa and A. Suzuki, "Evaluation of Bit Performance Using an Advanced Drilling–Test System", IADC/SPE 47809, pp. 247–252, Sep. 1998.

H.I. Bilgesu, U. Altmis, S. Ameri, S. Mohaghegh and K. Aminian, "A New Approach to Predict Life Based on Tooth or Bearing Failures", pp. 253–257, SPE 51082, Nov. 1998.

E.T. Koskie, Jr., P. Slagel and W. Lesso, Jr., "Monitoring MWD Torque Improved PDC/Bit Penetration Rates", pp. 61–67, World Oil, 1998.

Michael A. Simpson, Sr., "Hand–Held Calculator Program Helps Optimize Drilling", pp. 97–101, World Oil, Apr. 1984.

Kenneth L. Mason, "3–Cone Bit Selection With Sonic Logs", pp. 135–142, SPE Drilling Engineering, Jun. 1987, first published Sep. 1984 in Houston, Texas.

Allen D. Gault, "Measurement of Drilling Properties", pp. 143–148, SPE Drilling Engineer, Jun. 1987, published New Orleans, Louisiana, Mar. 1985.

T.M. Burgess, W.C. Lesso, "Measuring The Wear of Milled Tooth Bits Using MWD Torque And Weight–On–Bit", SPE/IADC 13475, pp. 453–458 for pages illustration, published Mar. 1985, New Orleans, Louisiana.

* cited by examiner

ITERATIVE DRILLING SIMULATION PROCESS FOR ENHANCED ECONOMIC DECISION MAKING

This application is a continuation-in-part of co-pending U.S. patent application Ser. No. 09/649,495, entitled "Method and System for Predicting the Performance of a Drilling System for a Given Formation" filed Aug. 8, 2000, now U.S. Pat. No. 6,408,953, which is a continuation-in-part application of Ser. No. 09/192,389, filed Nov. 13, 1998, now U.S. Pat. No. 6,109,368, which is a continuation-in-part of Ser. No. 09/048,360, filed Mar. 26, 1998, now U.S. Pat. No. 6,131,673, which is a continuation-in-part of application Ser. No. 08/621,411, filed Mar. 25, 1996, now U.S. Pat. No. 5,794,720. The co-pending patent application and issued patents are incorporated herein by referenced in their entirety.

BACKGROUND

The present disclosure relates to geology and drilling mechanics, and more particularly to an iterative drilling simulation method and system for enhanced economic decision making.

Prior drilling prediction methods have included the use of geology and drilling mechanics for selecting an appropriate bit for use in the drilling of a bore hole in a particular formation. For example, with respect to bit selection, a rock strength column characterizes the particular geology. The rock strength column is calculated from well logs. Then, one or more bits are "matched" to the rock strength.

In another method, referred to as OASIS available from Baker Hughes of Houston, Tex. a drilling optimization service operates in a manner similar to the way that oil companies have done themselves for determining a drilling optimization, but on a farmed out basis.

In yet another method, referred to as DROPS drilling simulator available from DROPS Technology AS of Norway, the DROPS drilling simulator drilling optimization service includes reverse engineering a rock strength column from a "geolograph." The geolograph includes a minute-by-minute record of drilling rate from a previous drilled well. The DROPS drilling simulator method then looks at bit selections that fit the estimated rock strength column.

SUMMARY

An iterative drilling simulation method for enhanced economic decision making includes obtaining characteristics of a rock column in a formation to be drilled, specifying characteristics of at least one drilling rig system; and iteratively simulating the drilling of a well bore in the formation. The method further produces an economic evaluation factor for each iteration of drilling simulation. Each iteration of drilling simulation is a function of the rock column and the characteristics of the at least one drilling rig system according to a prescribed drilling simulation model.

In addition, a recommendation package based upon a given iteration of the simulated drilling of a well bore is produced. The recommendation package enables enhanced decision making with respect to an actual drilling in a field containing formations analogous to the rock column. An iterative drilling simulation system and computer program are also disclosed.

DETAILED DESCRIPTION

Figure 1:
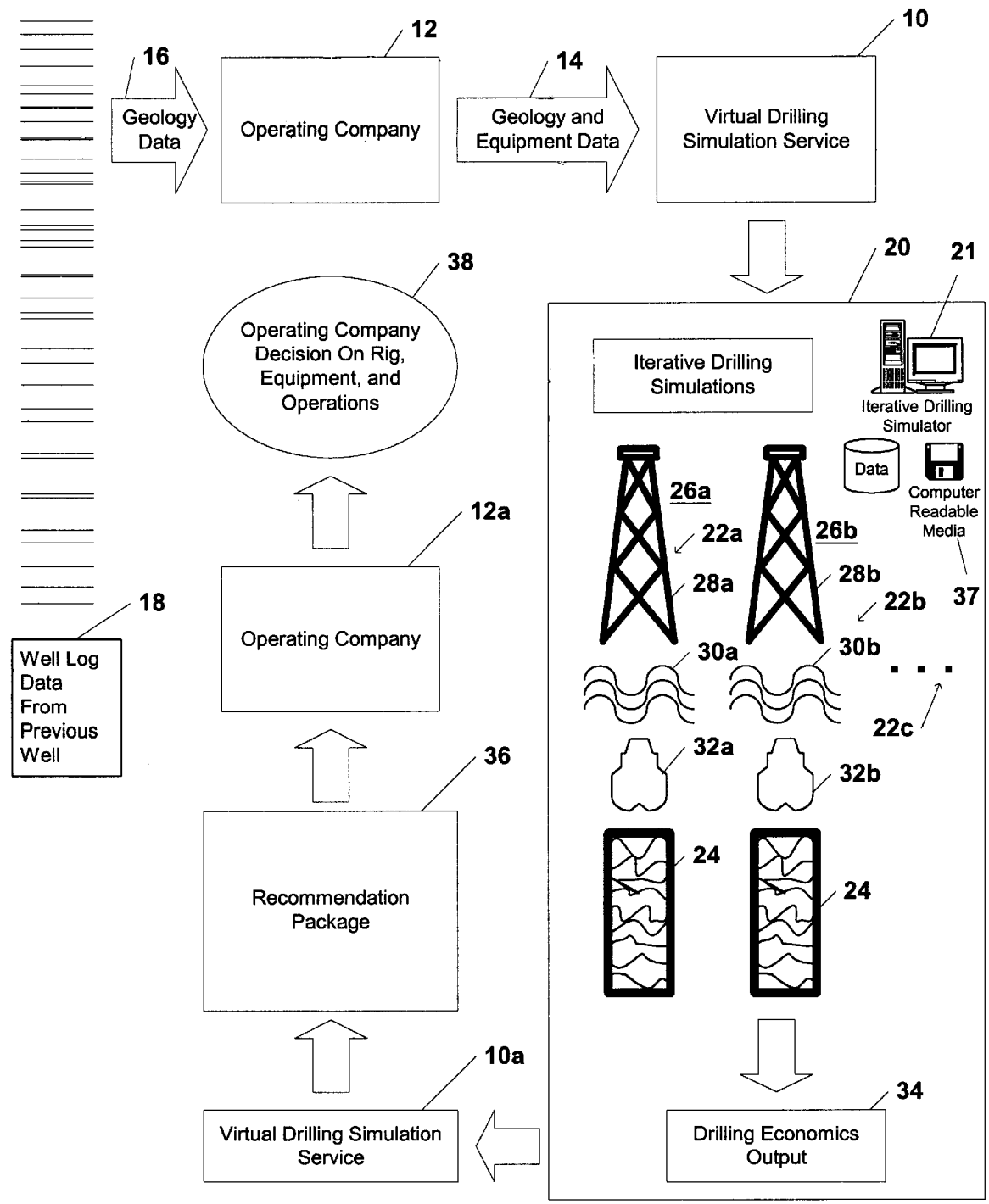
FIG. 1 is a block diagram overview of the iterative virtual drilling simulation service according to one embodiment.

The present embodiments provide various drilling simulation models capable of more accurately defining drilling costs as a function of predicted drilling performance than previously known. The present embodiments further provide simulation and recommendation information suitable for enabling better economic decisions to be made by rig contractors, oilfield operating companies, and others, as may be appropriate.

According to one embodiment of the present disclosure, various combinations of drilling rig systems with differing energy input capabilities, bits, and fluid properties are iteratively simulated to produce corresponding virtual drilling scenarios. The virtual drilling scenarios are suitable for use in economic decision making. The iterative simulator of the present disclosure provides recommendations, including detailed information, sufficient to assist a drilling contractor in making a best decision, in view of available equipment, constraints, and economics, as further discussed herein.

The iterative drilling simulator method and system of the present disclosure, utilizes drilling mechanics software, as a function of prescribed drilling mechanics models, for "drilling" with various computerized bits and comparing their respective predicted performances during the drilling of a well bore in a given formation.

The present embodiments further include a method of iteratively simulating the drilling of a well bore using alternate drill rig and equipment selections. According to one embodiment, the simulations are requested and performed at the front end of a drilling operator's economics decision making process. Subsequent to an iterative drilling simulation, recommendations are generated as a function of the iterative drilling simulations for a particular geology formation and economic evaluation factors.

The present embodiments further include a software enabled business process for greatly increasing accuracy and reducing a risk window of high value decision making in the oil and gas business. Currently in the art, only the roughest of estimates are made as to ultimate drilling costs for a given prospect, such estimates being made without software and iterative drilling simulation such as disclosed herein.

According to one embodiment of the present disclosure, the simulator includes a system for predicting performance of a drilling system, such as that disclosed in U.S. Pat. No. 6,109,368, incorporated herein by reference. The system for predicting performance of a drilling system, coupled with financial models and iterative drilling simulations as discussed herein, produces content for inclusion in a recommendation output as a function of economic evaluation factors. Accordingly, the simulator output enables the making of far more accurate and sophisticated decisions, than previously known.

The present embodiments further includes a business process in which estimated rock columns developed from well logs, or from seismic data, are "drilled" with a software simulator in an iterative manner. Drilling of the estimated rock columns is carried out with varying input parameters, including different drilling rig equipment characteristics, for generating estimates of comparative economics. The present embodiments provide a useful tool for assisting in one or more of the following types of significant decision making processes:

Comparative rig selection,

Rig modification and upgrade valuations,

Lease asset comparisons,

Down hole tool economics,

Contractor pricing and equipment qualification studies,

Economic impact of drilling fluids selection,

Estimates of time to first economic hydrocarbon production,

Estimations of infield drilling economics, and

Leased and producing property value and drilling cost evaluations.

Equipped with one or more of the embodiments of the present disclosure, a consulting firm could provide services in accordance with the present embodiments, for assisting with the significant decision making processes to be made by a drilling operator or drilling contractor, further as discussed herein.

Referring now to FIG. 1, a block diagram overview of the iterative virtual drilling simulation method for enhanced economic decision making according to one embodiment is illustrated. The iterative drilling simulation method includes a virtual drilling simulation service 10 receiving a request for services from an operating company 12. In this example, the operating company provides geology data and equipment data 14, as appropriate, in connection with a proposed drilling of a well bore in a given formation. For example, the operating company 12 provides geology data 16 from well log data 18 obtained from a previous well (or wells). Accordingly, the iterative drilling simulation method includes obtaining characteristics of a rock column in a formation to be drilled and characteristics of at least one drilling rig system. The operating company also specifies the characteristics of at least one drilling rig system for consideration.

The method further includes iteratively simulating the drilling of a well bore in the formation and producing an economic evaluation factor for each iteration of drilling simulation, generally indicated by reference numeral 20. Each iteration of drilling simulation (22a,22b) is a function of the rock column 24 and the characteristics of the at least one drilling rig system (26a,26b) according to a prescribed drilling simulation model. Additional iterations of drilling simulations are illustrated by "...", as indicated by reference numeral 22c. In one embodiment, the drilling simulation model includes one or more of a mechanical efficiency model, bit wear model, hole cleaning efficiency model, penetration rate model, and drilling economics model, as discussed further herein.

As shown in FIG. 1, the first drilling rig system 26a is characterized by the properties of drilling rig 28a, the properties of drilling fluid 30a, and the properties of drill bit 32a. Similarly, the second drilling rig system 26b is characterized by the properties of drilling rig 28b, the properties of drilling fluid 30b, and the properties of drill bit 32b. Additional drilling rig systems can be considered, however, only two have been shown for simplicity of illustration.

The iterative drilling simulation method further includes producing a drilling economics output 34 for each of the iterative drilling simulations, the drilling economics output corresponding to one or more economic evaluation factor. According to one embodiment, the economic evaluation factor includes a minimum number of hours on bottom to drill a desired well bore. The economic evaluation factor may also include a minimum cost amount for drilling the well bore, wherein the minimum cost amount is a function of both a minimum number of hours on bottom to drill the well bore and a cost per day for a respective drilling rig system.

Although the economic evaluation factors have been discussed herein as including a minimum number of hours on bottom and a minimum cost amount for drilling the well bore, other economic evaluation factors are possible. There is a recognition that other factors effect economics. For example, such other factors include trip time, trouble time, and weather related downtime.

According to another embodiment, trip time, trouble time, and weather related down time can be included as economic evaluation factors, as determined according to basic rules of thumb in the field. For example, trip time for an older rig may be 1,000 feet of pipe per hour, whereas trip time for a newer rig may be 1,200 feet of pipe per hour. Utilizing basic rules of thumb, appropriate estimates are added to a total drilling time for the iterative simulated drilling of a well bore, as a function of one or more of trip time, trouble time, or weather related downtime. Percentages of drilling time, tripping time, trouble time, or weather related downtime may be included in a simulation. For example, the total drilling and tripping time may amount to eighty percent (80%) and trouble time may amount to twenty percent (20%) of the total time needed to drill the well bore in the given formation.

The iterative drilling simulator method and system can more accurately reflect what goes on at the rig in the drilling of a well bore, including, for example, a number of trips expected to be made for replacing a bit, failed motor, etc. Accordingly, the ultimate drilling cost will not only account for time on bottom, but also take into account a rig down time ("trouble time") based upon a percentage over and above the time needed to drill the well bore. For example, during an iterative drilling simulation, a number of bits may be considered. One iteration may require two fast bits and trip time for replacing the first bit with the second bit. Another iteration may only require a single slow bit that is capable of drilling all the way to the bottom of the well bore.

According to one embodiment, the iterative drilling simulator method and system produce an economic evaluation of the iterative simulations that include consideration for one or more of the cost of a trip, trouble time, logistics time, and weather related down time, as part of an overall economic evaluation. For example, a suitable multiplication factor proprietary to a given drilling operator can be used to adjust a simulated drilling iteration drill time for a given well bore. For one drilling operator, the proprietary multiplication factor may be seventeen percent (17%). For another, the proprietary multiplication factor may be twenty two percent (22%).

With the embodiments of the present disclosure, multiplication factors taking into account an operator's own trouble time experience can be factored into an economic evaluation of an iterative drilling simulation. Such percentage or percentages can be based upon the experience of a respective operator. For example, an off shore drilling rig may experience a certain percentage of weather related down time, such as during a hurricane season, when all crew members are required to leave the rig for safety concerns. If the off shore rig is planned to drill for a three year period, then some portion of that time will likely include weather related downtime, as well as other factors as noted herein. Accordingly, while the iterative simulation method and system of the present disclosure provides an economic evaluation output scientifically linked to the geology of the formation in the drilling of a well bore, the economic evaluation output can be further adjusted to take into account one or more of trouble time, logistics time, or weather related down time.

Referring still to FIG. 1, equipped with drilling economics output 34, the virtual drilling simulation service (at 10a) reviews and analyzes the same for producing a recommendation package output, generally indicated by reference numeral 36, and as further discussed herein. The review and analysis may be performed automatically via computer control, manually, or a combination of both, according to prescribed evaluation rules. The evaluation rules may include economic rules and/or other rules pertinent to a particular drilling scenario.

The operating company (at 12a) receives the recommendation package 36, and in response thereto, renders an enhanced decision on rig equipment and operations, as generally indicated by reference numeral 38. Accordingly, the method of the present disclosure facilitates enhanced economic decision making with respect to drilling of a well bore in a given formation, further as a function of drilling system characteristics and economic evaluation factors for the particular geology of the formation.

Figure 2:
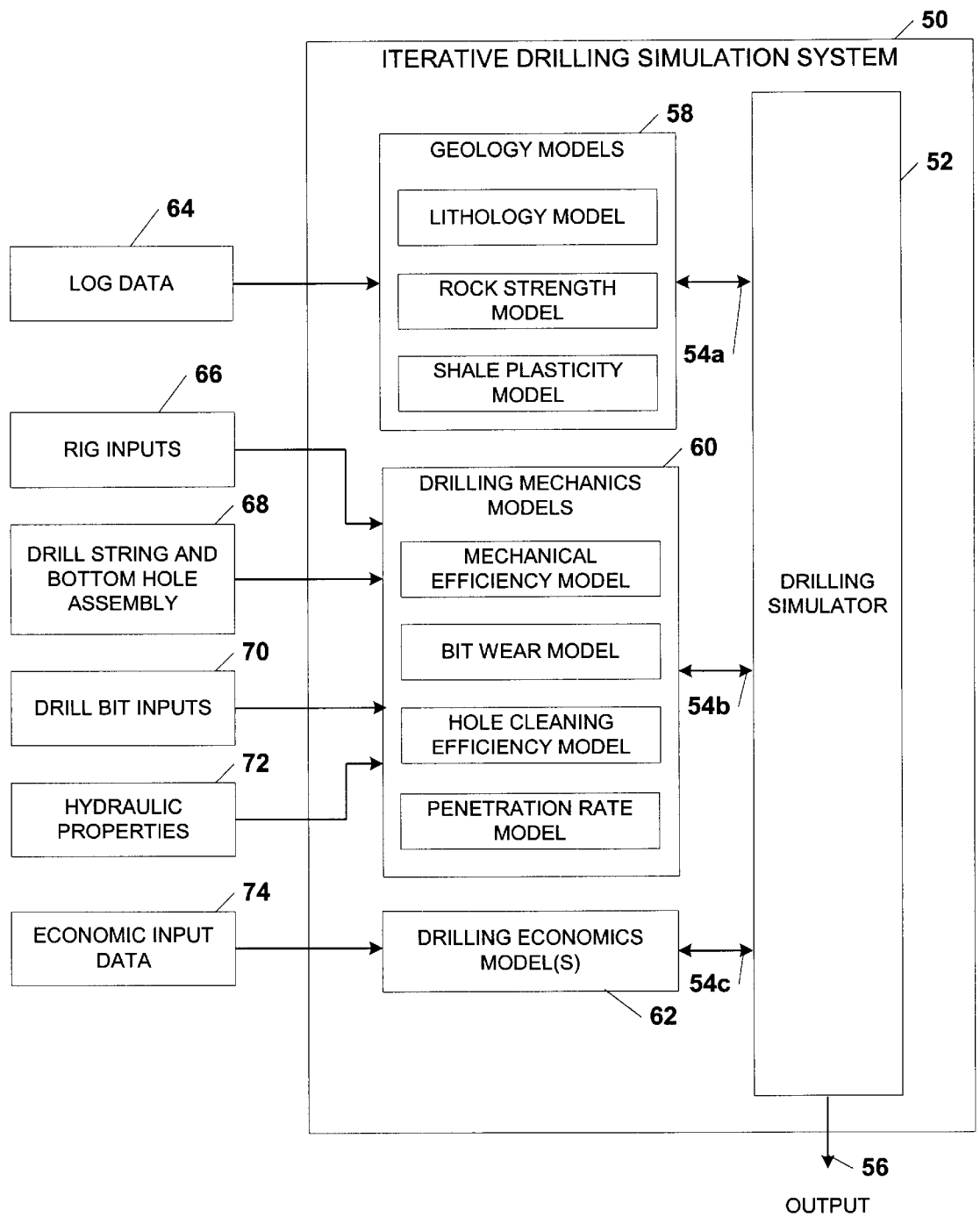
FIG. 2 is a block diagram representation of the iterative drilling simulation system according to one embodiment.

FIG. 2 is a block diagram representation of the iterative drilling simulation system according to one embodiment. As illustrated, the iterative drilling simulation system 50 includes a drilling simulator processor 52, responsive to inputs (54a,54b,54c), for producing an iterative drilling simulation output 56, as further discussed herein. The iterative drilling simulation system 50 is characterized by geology models 58, drilling mechanics models 60, and drilling economics models 62.

The geology models 58 provide rock column characteristic input 54a to the drilling simulator processor 52. The characteristics of the rock column include at least one or more of lithology, rock strength, shale plasticity, log data, and porosity. With respect to the characteristics of lithology, rock strength, and shale plasticity, one or more of the respective characteristics may be derived from log data and a respective lithology model, rock strength model, and shale plasticity model. Log data 64 can include one or more of well logs, mud logs, core data, and bit records. In a preferred embodiment, the geology models include those disclosed in co-pending U.S. patent application Ser. No. 09/649,495, entitled "Method and System for Predicting the Performance of a Drilling System for a Given Formation" filed Aug. 8, 2000, now U.S. Pat. No. 6,408,953, which is a continuation-in-part application of Ser. No. 09/192,389, filed Nov. 13, 1998, now U.S. Pat. No. 6,109,368, incorporated herein by reference.

The drilling mechanics models 60 provide drilling rig system characteristic input 54b to the drilling simulator processor 52. It is noted that the drilling rig system characteristics can include characteristics of more than one drilling rig system, wherein characteristics for a single drilling rig system are utilized in connection with a respective iteration of drilling simulation. In a preferred embodiment, the drilling mechanics models include those disclosed in co-pending U.S. patent application Ser. No. 09/649,495, entitled "Method and System for Predicting the Performance of a Drilling System for a Given Formation" filed Aug. 8, 2000, which is a continuation-in-part application of Ser. No. 09/192,389, filed Nov. 13, 1998, now U.S. Pat. No. 6,109,368, incorporated herein by reference.

The characteristics of the drilling rig system can include one or more of the following: rig inputs 66, drill string and bottom hole assembly inputs 68, drill bit inputs 70, and hydraulic properties 72. The rig inputs 66 include one or more of the following: operating constraints, rig costs, maximum weight on bit, top drive torque, table drive torque, top drive minimum RPM (revolutions per minute), table drive minimum RPM, top drive maximum RPM, table drive maximum RPM, maximum GPM (gallons per minute) for pumps, and standpipe maximum PSI (pounds per square inch).

The drill string and bottom hole assembly (BHA) characteristics 68 include one or more of the following: motor RPM (revolutions per minute), turbine RPM, motor torque, turbine torque, rotary steerable system, PSI (pounds per square inch) loss through BHA, PSI string loss, string torque, string drag, and drill string economics. The drill bit inputs 70 include, for example, bit type, bit diameter, bit cutting structure 3D (three dimensional) model, bit work rating, bit wear rating, bit junk slot area, bit TFA (total flow area), and bit pressure drop.

With respect to hydraulic properties 72, the hydraulic properties include one or more of the following: oil, synthetic, water, weight PPG (pounds per gallon), yield point, plastic viscosity, annular velocity, water loss, lost circulation, ECD (equivalent circulating densities), depth in, depth out, maximum ROP (rate of penetration), and fluid costs.

The iterative drilling simulation system further includes one or more drilling economics model 62. Economic data particular to a given virtual drilling scenario is input at 74. Responsive to the economic input data, the drilling economics model 64 provides input to the drilling simulator processor 52 at 54c, for use during an iterative drilling simulation, according to the particular requirements for a given iterative drilling simulation application, as appropriate.

Figure 3:
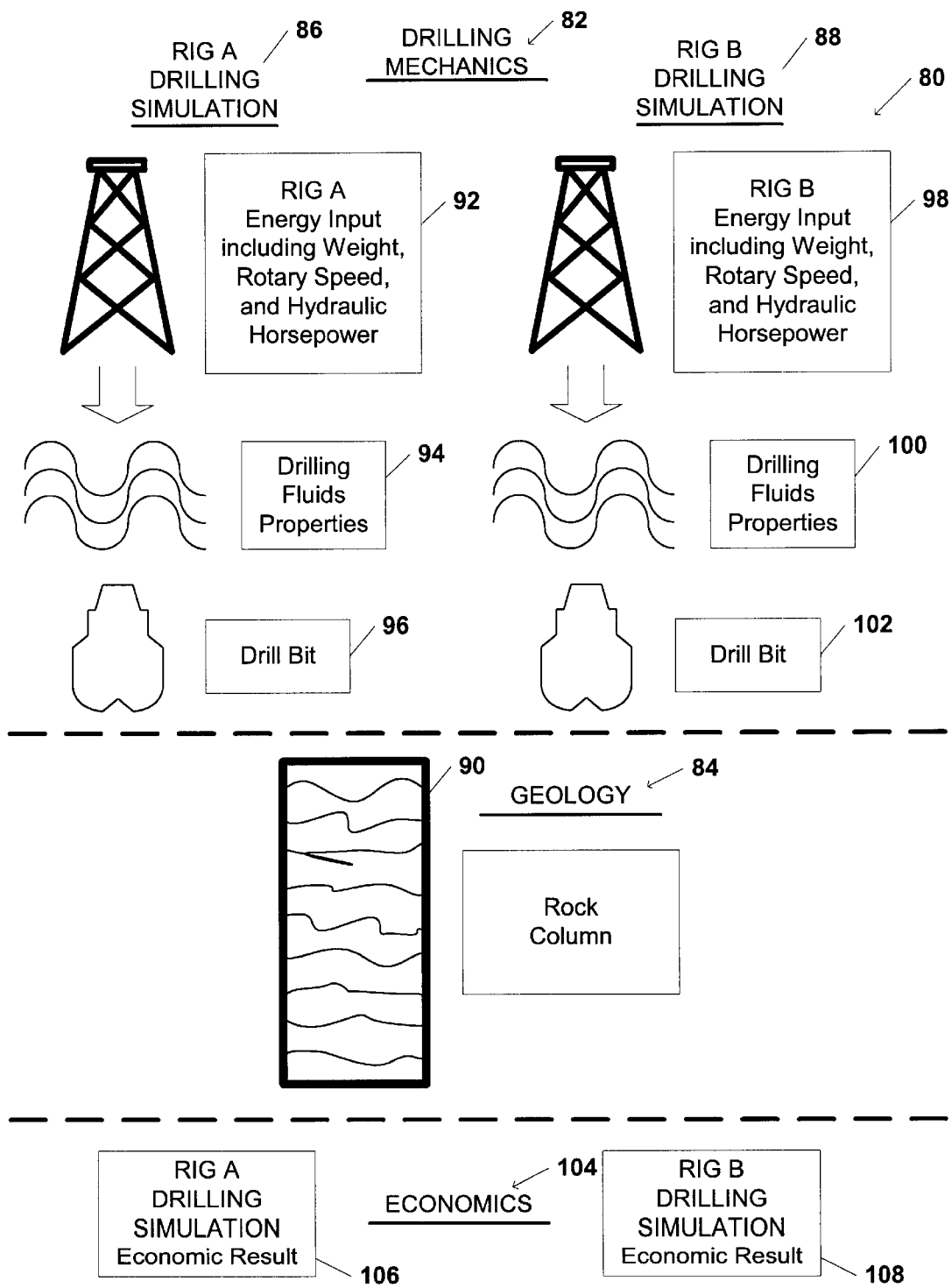
FIG. 3 is a block diagram view of an iterative virtual drilling simulation according to an embodiment of the present disclosure.

FIG. 3 is a block diagram view of an iterative virtual drilling simulation according to an embodiment of the present disclosure. The iterative drilling simulation 80 includes virtual drilling simulations in response to a request for services, for example, from an operating company. The iterative drilling simulation involves both drilling mechanics 82 and geology 84. The drilling simulations include drilling mechanics analyses performed for a first drilling system 86 and a second rig system 88 in connection with rock column 90 of geology 84. In this example, the geology data may have been obtained from well log data of a previously drilled well (or wells) for determining the rock column 90. Accordingly, the rock column 90 characterizes the formation to be drilled.

As shown in FIG. 3, equipment data for the Rig A drilling simulation 86 includes Rig A energy inputs 92, drilling fluid properties 94, and drill bit inputs 96. The energy inputs 92 include weight, rotary speed, and hydraulic horsepower. Similarly, equipment data for the Rig B drilling simulation 88 includes Rig B energy inputs 98, drilling fluid properties 100, and drill bit inputs 102.

The simulation of FIG. 3, includes iterative simulations of the drilling of a well bore in the formation characterized by rock column 90 with Rigs A and B. The simulation produced drilling simulation economics 104 that comprises at least one economic evaluation factor for each respective iteration of drilling simulation. In one example, the economic evaluation factor may include a minimum number of hours on bottom to drill a desired well bore. The economic evaluation factor may also include a minimum cost amount for drilling the well bore, wherein the minimum cost amount is a function of both a minimum number of hours on bottom to drill the well bore and a cost per day for a respective drilling rig system. Accordingly, economic results, as generally indicated by reference numerals 106 and 108, respectively, correspond to one or more evaluation factors of a respective iterative drilling simulation. Each iteration of drilling simulation (86, 88) is a function of the rock column 90 and the characteristics of the a respective one of the drilling rig systems according to a drilling simulation model. The drilling simulation model includes one or more of a mechanical efficiency model, bit wear model, hole cleaning efficiency model, penetration rate model, and drilling economics model, as discussed further herein.

Drilling Mechanics Analysis

To assist in greater understanding of the present embodiment, the following discussion relates to exemplary data requirements for a drilling mechanics analysis in connection with the iterative drilling simulation method and system of the present disclosure.

For each interval of well bore being analyzed, the drilling mechanics analysis utilizes information that may include one or more of the following: lithology, rock strength, shale plasticity, drilling mechanics optimization, and illustrations of one or more drill bits for use in drilling the well bore. Intervals are specified with a start depth and an end depth.

For an analysis request, well logs are obtained from the operating company or other suitable source. The well logs may include one or more of the following: gamma ray, sonic, neutron, density, photoelectric, NMR (nuclear magnetic resonance), spectral gamma ray, and caliper. Additional data provided by the operating company, or other suitable source, may include mud logs, bit records, or other pertinent information.

For a given drilling mechanics analysis, bit data for a proposed well is considered. The bit data comprises information for each bit run. Accordingly, bit data may include one or more of the following: bit size, bit type, proposed depth in, proposed depth out, ROP, and cost. In one example, cost refers to a cost per foot analysis based upon an hourly rig cost. The drilling mechanics analysis further includes, for a given bit run, specification of one or more of the following for a respective bit: a work rating (expressed in units of ton-mi), a sharp bit slope, a worn bit slope, a friction slope, and bit contact area (initial and final).

The drilling mechanics analysis still further includes operating constraints for a given bit run. The operating constraints include one or more of the following: maximum torque (expressed in units of ft-lbs) for top drive, rotary table, drill pipe, motor, or turbine; minimum RPM (revolutions per minute) for top drive, rotary table, motor, or turbine; maximum RPM for top drive, rotary table, motor, or turbine; maximum WOB (weight on bit) (expressed in units of klbs); and maximum ROP (rate of penetration) (expressed in ft/hr).

Further data for each bit run can include drill string torque losses and/or drill string data. Drill string data includes one or more of the following: drill pipe (OD×Wt), HWDP (OD×length), drill collars (OD×length), and motor (OD× type).

The drilling mechanics analysis may also include the use of measured operating parameters for an offset well, along with a request for iterative drilling simulation services. The measured operating parameters of the offset well may be provided by an operating company or other suitable source. Offset drilling data includes ROP, WOB, and RPM—total. The offset drilling data may optionally include one or more of torque, motor RPM, surface RPM. For the offset drilling data, the operating parameters are specified for a start depth and end depth each respective section of well bore.

The simulator of the present disclosure performs a drilling mechanics analysis that includes an analysis of rock mechanics for a given formation. The analysis of rock mechanics provides information regarding one or more of lithology, porosity, confined rock strength, unconfined rock strength, and shale plasticity. The simulator performs the rock mechanics analysis based upon one or more of the following: well logs, mud logs, bit record(s), and recommended bit(s).

Well Logs. At a minimum, a gamma ray log and at least one (1) additional log is needed. The additional log includes at least one or more of the following logs: nuclear magnetic resonance (NMR), photoelectric (Pe) with neutron density; neutron density, and sonic. The gamma ray is typically run in combination with the log suites listed above. In general, a more accurate lithology analysis can be obtained when more of the above logs are provided for performing the analysis.

Additional optional information would be useful for the lithology analysis, if available. The additional optional information includes one or more of spectral gamma ray log, caliper log, core porosity, and rock strength. According to one embodiment, the shale plasticity model utilizes data from the spectral gamma ray log. The caliper log data is used to evaluate data quality. In addition, the core porosity and/or rock strength is used to calibrate the logs.

Mud Logs. Mud logs provide a valuable "reality check" for the lithology analysis. In particular, the mud logs assist in identifying any non-shales contained within the given geology.

Bit Records. Bit records provide a valuable "reality check" for the rock strength analysis, especially if the sonic log is the only available porosity log.

Proposed Bits. Information regarding proposed bits, such as photos and specifications, can be included in a recommendation package, as further discussed herein. If a depth interval is established for a proposed bit, the depth interval can be displayed or shown graphically in the recommendation package, also.

Drilling Mechanics. In one embodiment, the drilling mechanics analysis provides an output in the form of a "driller's road map." In particular, the drilling mechanics analysis provides predicted performance of a given bit in the drilling of a well bore in a given formation. Drilling mechanics information includes one or more of the following: work done by a proposed bit in drilling through rock of known compressive strength; bit wear condition; mechanical efficiency of the bit as a function of rock strength and wear condition; cutting torque and total torque produced by the bit; operating power level as a function of the bit and an corresponding drilling rig; constraint analysis indicating which operating constraint are in effect; optimal operating parameters, including WOB and RPM; predicted ROP, including instantaneous and average; and predicted cost per foot.

The simulator method and system of the present disclosure perform drilling mechanics analysis with the use of one or more of the following types of information: bit data, rig operating constraints, directional survey data and proposed directional well plan, torque and drag analysis; and measured operating parameters, for performing a history match, as appropriate.

With respect to a given bit, a bit assembly number can be used to identify the specific bit design. Upon establishment of a 3-D geometry for a given bit, a torque-WOB signature can be generated using an appropriate 3-D bit model. Accordingly, predicted performance reflects the specific bit design.

Operating Constraints. Operating constraints that define a safe operating window for the driller include one or more of the following: maximum safe operating torque (in units of ft*lb); maximum safe operating WOB; maximum safe operating RPM; minimum safe operating RPM; and maximum allowable ROP. According to the embodiments of the present disclosure, the above operating constraints apply at the bit. Accordingly, the drilling mechanics analysis facilitates an ability to handle a wide variety of drilling situations. The operating constraints are discussed further herein below.

Torque constraint. For a given bit run, the above limits are constraints, except for torque which is variable. For example, suppose the top drive is able to generate a (theoretical) maximum of 10,000 ft*lb of torque according to available information, such as an engineering manual from the equipment manufacturer. However, the toolpusher may indicate that the maximum safe operating torque is 7,000 ft*lb based upon the toolpusher's experience with the rig equipment. Suppose, also, that the proposed bit run is from 5,000 to 10,000 ft measured depth (MD), where measured depth is along the well path. A standard torque and drag analysis might indicate that 1,000 ft*lb of torque is lost because of friction between the drill string and the bore hole wall at the beginning of the bit run and that 2,000 ft*lb is lost at the end of the bit run. This means that the actual torque transmission to the bit is 6,000 ft*lb maximum at the beginning of the bit run, gradually decreasing to 5,000 ft*lb at the end of the run. If a mud motor is used, then the maximum torque output of the motor would also be needed. Accordingly, when appropriate, the torque capabilities of the drilling rig are included in the drilling rig characteristics for use in a given drilling simulation.

Torque and Drag Analysis. The present embodiments utilize a torque and drag analysis for converting surface torque limits to equivalent limits at the bit. Such a torque and drag analysis is generally available from a drilling engineer of the operating company, since a torque and drag analysis is typically part of a well plan. Alternatively, a separate torque and drag analysis may be conducted, however, such an analysis requires a complete description of the drill string and bottom hole assembly. In addition, a reasonable estimate can be made if the drill sting torque losses at total depth (TD) are known. A toolpusher often has information from prior measurements of on-bottom and off-bottom torque. Furthermore, this information is sometimes available on morning reports at various depths or when TD is reached.

WOB Constraint. According to one embodiment of the present disclosure, for a given simulation recommendation, a maximum safe operating WOB depends on the weight of the drill string below the neutral point, and the hook load capacity of the rig. In addition, the maximum safe operating WOB also depends on expected rock strength and bit selection. In conjunction with determining a maximum safe operating WOB, it is advisable to examine the measured WOB from an offset well to get a feel for the historical maximum actually used, as opposed to a theoretical value. The maximum safe operating WOB may also include a safety factor.

RPM Constraints. According to one embodiment of the present disclosure, for a given simulation recommendation, the safe operating window for RPM depends on the specific machinery: rotary table, top drive, positive displacement motor, or turbine. Sometimes the safe operating window for RPM is a combination of specific machinery: for example, drilling with a motor in rotary mode, the motor RPM must be added to the surface RPM. In conjunction with determining a safe operating window for RPM, it is advisable to examine the measured RPM from an offset well to get a feel for the historical maximum and minimum RPM actually used, as opposed to the theoretical values alone. The safe operating window for RPM may also include a safety factor.

ROP Constraint. The ROP constraint reflects the limitations of the drilling fluid system as well as related geologic considerations. For example, an analysis of the hydraulics system may reveal that the rig pumps are capable of cleaning hole properly as long as the penetration rate does not exceed 300 ft/hr. However, a geologic study may reveal that if the penetration rate exceeds 200 ft/hr, the dynamic mud weight will exceed the fracture gradient at the casing shoe. Accordingly, the ROP constraint would be set to the lower of these two limits. A toolpusher would generally be well aware of this constraint.

Directional Data (optional). According to one embodiment of the present disclosure, the iterative drilling simulation method and system perform a drilling mechanics analysis based upon well logs taken from a nearby offset well for a given formation. However, a drilling mechanics analysis is needed along the proposed well path of the next well to be drilled. Accordingly, this can be accomplished if a directional survey for the offset well, and a directional well plan for the proposed well, are available.

Measured Operating Parameters. According to one embodiment of the present disclosure, measured operating parameters from an offset well, while optional, are very useful in determining what the actual values are for the various operating constraints. The measured operating parameters include one or more of the following: weight-on-bit, rotary RPM, penetration rate, and torque-on-bit (ft*lb). Even if torque is unavailable, as is often the case, a history match can still be made with the other operating parameters.

Rig operating constraints provided by a rig operator should be reasonably close to actual field performance. Measured operating parameters from an offset well enable double-checking and confirming that the constraints are correct.

Measured operating parameters are also used to history-match the particular drill bit to the specific geology and rig. This can significantly increase confidence in the predicted drilling performance results, and the value of the analysis to the driller. Accordingly, measured operating parameters are helpful.

Figure 4:
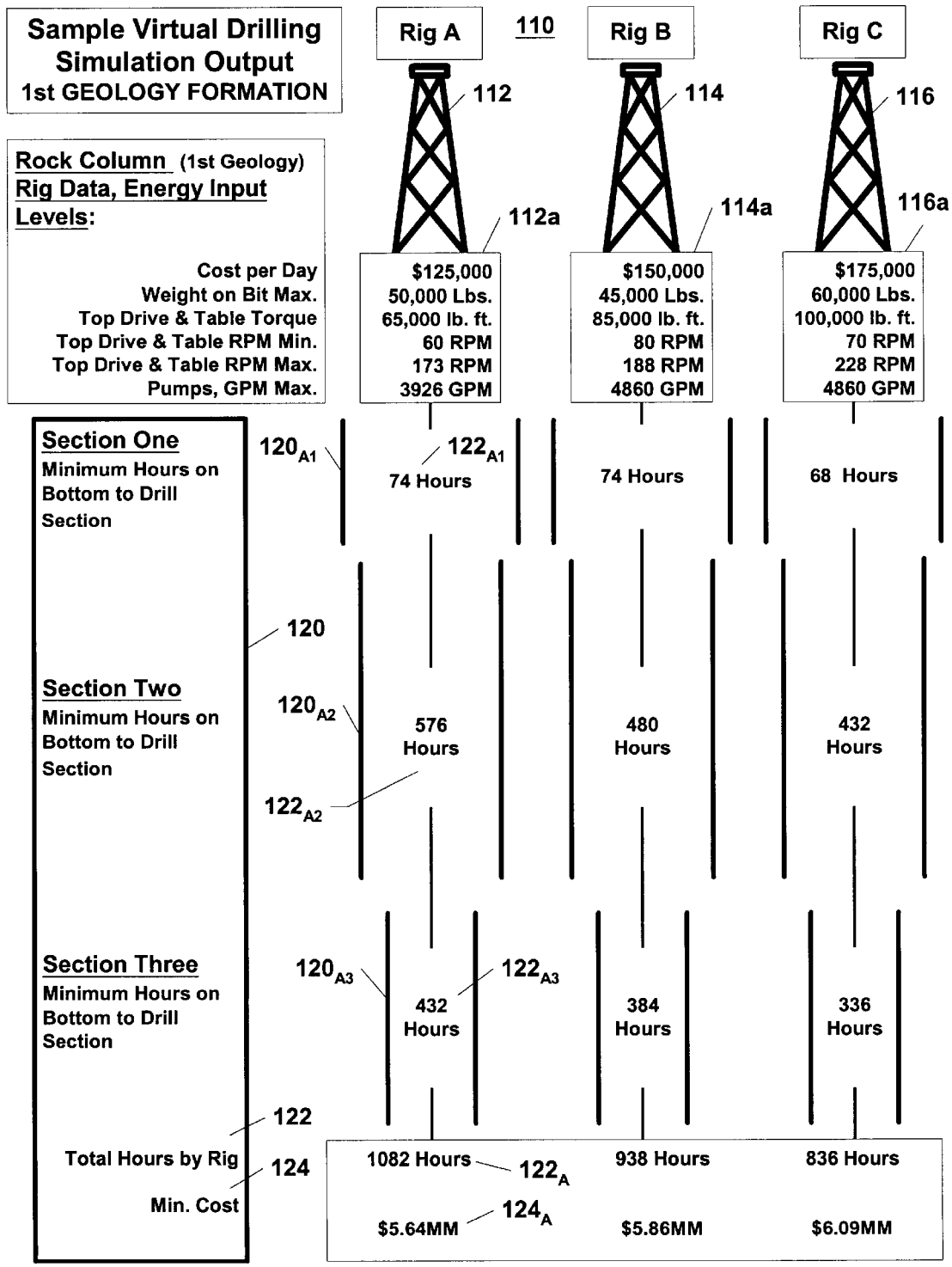
FIG. 4 is an exemplary output view of a sample iterative virtual drilling simulation for a first geology.

Turning now to FIG. 4, an exemplary output 110 of a sample iterative virtual drilling simulation for a first geology formation is illustrated. In the iterative virtual drilling simulation output 110 of FIG. 4, certain rig data and energy input levels are specified for Rig A (112), Rig B (114) and Rig C (116), as indicated by reference numerals 112a, 114a, and 116a, respectively. As shown, the rig data and energy input levels include cost per day, maximum weight on bit, top drive and table torque, minimum RPM for the top drive and table motor, maximum RPM for the top drive and table motor, and a maximum GPM for pumps. The characteristics of a drilling rig system can also include one or more of the following: bit specification, down hole motor, top drive system, rotary table, mud system, mud pump, hydraulics, and operating parameters. In addition, the operating parameters may include weight-on-bit (WOB), rotary RPM (revolutions per minute), cost per day, rate of penetration (ROP), torque, and pump flow rate.

According to one embodiment of the present disclosure, the well bore to be drilled includes a plurality of sections 120 of well bore, as illustrated in FIG. 4. In this embodiment, an economic evaluation factor includes a minimum number of hours on bottom to drill a respective section of well bore in a geology formation characterized by a given rock column. That is, each section may be characterized by a minimum number of hours ($122_{A1}$, $122_{A2}$, $122_{A3}$) on bottom to drill a respective section of well bore ($120_{A1}$, $120_{A2}$, $120_{A3}$). In addition, the economic evaluation factor may include a cumulative minimum number of hours, indicated by reference numeral 122 in FIG. 4, on bottom to drill the respective sections of well bore. The cumulative number of minimum hours on bottom to drill the respective sections of well bore in the first geology formation with Rig A amounted to 1082 Hours, as indicated by reference numeral 122A.

The iterative virtual drilling simulation output 110 further includes an economic minimum cost 124 for each drilling rig system in the drilling of the well bore in the first geology formation. The minimum cost 124 is a function of the cost per day of a respective drilling rig system (converted into cost per hour, as appropriate) multiplied by a corresponding cumulative minimum number of hours to drill the well bore for a respective iterative simulation. For example, using the iterative drilling simulation method of the present disclosure, the total minimum number of hours on bottom to drill the respective sections of well bore with Rig A amounted to 1082 hours. The minimum cost of Rig A in the drilling of the well bore amounted to $5.64 million dollars ((1082(Hours)/24(Hours/Day))×125,000($/Day)=$5.64 MM), as indicated by reference numeral 124A. Similarly, the iterative drilling simulation output 110 includes a minimum number of hours on bottom for respective sections of well bore, the cumulative total minimum number of hours on bottom, and a cost for each of the other drilling rig systems Rig B 114 and Rig C 116, respectively.

As discussed herein, according to one embodiment of the iterative simulation method of the present disclosure, the method generates a simulated well bore drilling performance output for a given iteration of simulated drilling of the well bore. As illustrated in the example output 110 of FIG. 4, the simulated well bore drilling performance output facilitates an enhanced economic decision making with respect to an actual drilling in a field containing formations analogous to the rock column with a respective drilling rig system. For example, from the output 110 of FIG. 4, an operating company can make an enhanced economic decision in the selection of a drilling rig system. From an economic standpoint, drilling rig system Rig A 112 provides the best selection over drilling rig system Rig B 114 and Rig C 116 for the drilling of a well bore in a given formation analogous to the rock column.

As illustrated in the example of FIG. 4, the simulated well bore drilling performance output 110 includes one or more of (a) identification of drilling rig system characteristics, the characteristics including at least a drilling rig system economic factor, (b) a representation of at least one section of well bore in the rock column, (c) a minimum duration of time needed on bottom to drill a respective at least one section of well bore, (d) a cumulative duration of time needed to drill all sections of well bore, and (e) a minimum cost amount determined as a function of the cumulative duration of time and the drilling rig system economic factor. The simulated well bore drilling performance output may also include a minimum duration of time needed on bottom to drill the well bore, without indicating the same for each section of the well bore.

Figure 5:
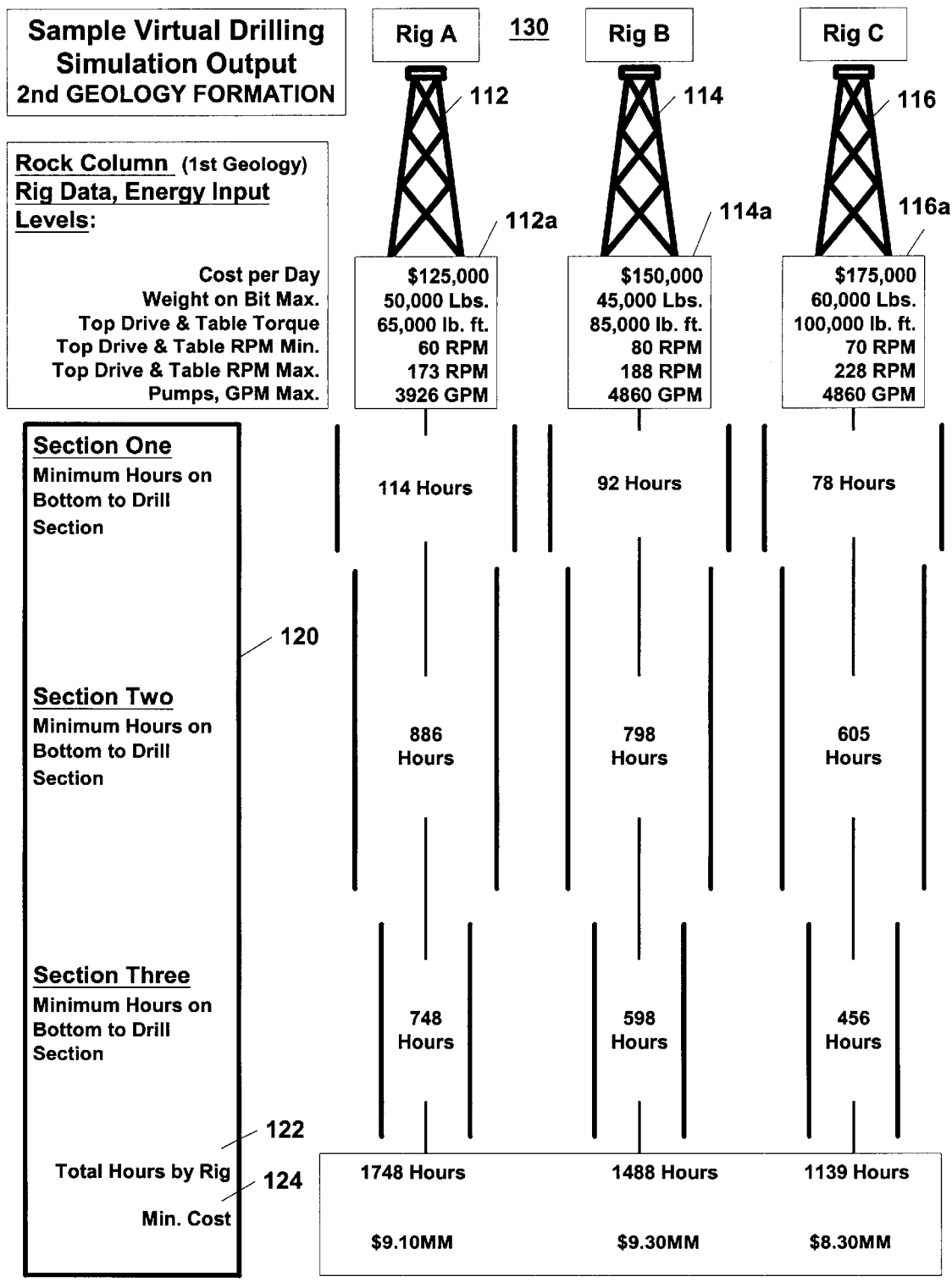
FIG. 5 is an exemplary output view of a sample iterative virtual drilling simulation for a second geology.

Referring now to FIG. 5, an exemplary output 130 of a sample iterative virtual drilling simulation for a second geology formation is illustrated. The iterative virtual drilling simulation output 130 of FIG. 5 is similar to that of FIG. 4 with respect to rig data and energy input levels specified for Rig A (112), Rig B (114) and Rig C (116), as indicated by reference numerals 112a, 114a, and 116a, respectively. However, the iterative simulated drilling with the drilling rig systems is with respect to a different geology formation. While the rig data and energy input levels of FIG. 5 are similar to those specified in FIG. 4, the various economic evaluation factors have changed as a result of the simulated drilling in a different rock column.

As illustrated in FIG. 5, the well bore to be drilled includes a plurality of sections 120 of well bore. In this embodiment, the economic evaluation factor includes a minimum number of hours on bottom to drill a respective section of well bore in a geology formation characterized by the given rock column. Each section is characterized by a minimum number of hours on bottom to drill a respective section of well bore. For example, the minimum number of hours on bottom to drill section two of the well bore with Rig A, Rig B, and Rig C amounted to 886 Hours, 798 Hours, and 605 Hours, respectively. In addition, the economic evaluation factor includes a cumulative total minimum number of hours (indicated by reference numeral 122) on bottom to drill the respective sections of well bore. In FIG. 5, the cumulative total number of minimum hours on bottom to drill respective sections of well bore in the second geology formation with Rig A, Rig B, and Rig C amounted to 1748 Hours, 1488 Hours, and 1139 Hours, respectively. Accordingly, the exemplary output 130 of FIG. 5 illustrates drilling rig system Rig C as producing the best economic performance over the drilling rig systems Rig A and Rig B in the simulated drilling of a well bore in the second geology formation.

According to another embodiment, the method of iterative drilling simulation includes generating a recommendation package 36 (FIG. 1) of drilling system characteristics for use in an actual drilling of a well bore in the formation as a function of economic evaluation factors. The recommendation package provides iterative simulation output content in one or more formats, including, for example, hardcopy, CD ROM, computer readable media, electronic file, holographic projection, compressed time animation, or any combination thereof. For example, the recommendation package may include a computer readable medium, as indicated by reference numeral 37 in FIG. 1.

With respect to compressed time animation, the recommendation package facilitates visualization of the simulated drilling of the well bore on a compressed time frame. For example, if the actual time to drill the well bore were thirty (30) days, then with the compressed time animation, the simulated drilling for the entire well could be visually viewed over some fraction of that time by a viewer using compressed time animation. Output embodying compressed time animation would give the operator the opportunity to quickly view the wellbore drilling system simulation presented through time. Each iteration can include compressed or collapsed time animation of the drilling process for that particular rig, set of system components, and rock column. The operator can review the output of a simulation in a few minutes that represents many hours of actual drilling time on bottom. The operator can also see the changes in the progress of the drilling brought about by changes in system components.

Accordingly, the compressed time animation could be highly beneficial to an operating company in making a best economic decision for the drilling of a well bore in a given formation. According to one embodiment, the compressed time animation utilizes the geology and mechanics models, as described herein, in the iterative drilling simulations for producing a respective economic evaluation output. Compressed time animation techniques are known in the art, and thus only briefly discussed herein.

In one embodiment, the recommendation package includes at least one economic evaluation factor and at least one recommendation of drilling rig system characteristics for use in an actual drilling of the at least one well bore in the formation as a function of the economic evaluation factors. The economic evaluation factor can be derived by the method of: (a) obtaining characteristics of a rock column in the formation to be drilled, (b) specifying characteristics of at least one drilling rig system, and (c) iteratively simulating the drilling of the well bore in the formation and producing an economic evaluation factor for each iteration of drilling simulation. Other economic evaluation factors are also possible, as discussed earlier herein. In addition, each iteration of drilling simulation is a function of the rock column to be drilled and the characteristics of the at least one drilling rig system according to a drilling simulation model, as discussed herein.

Figure 6:
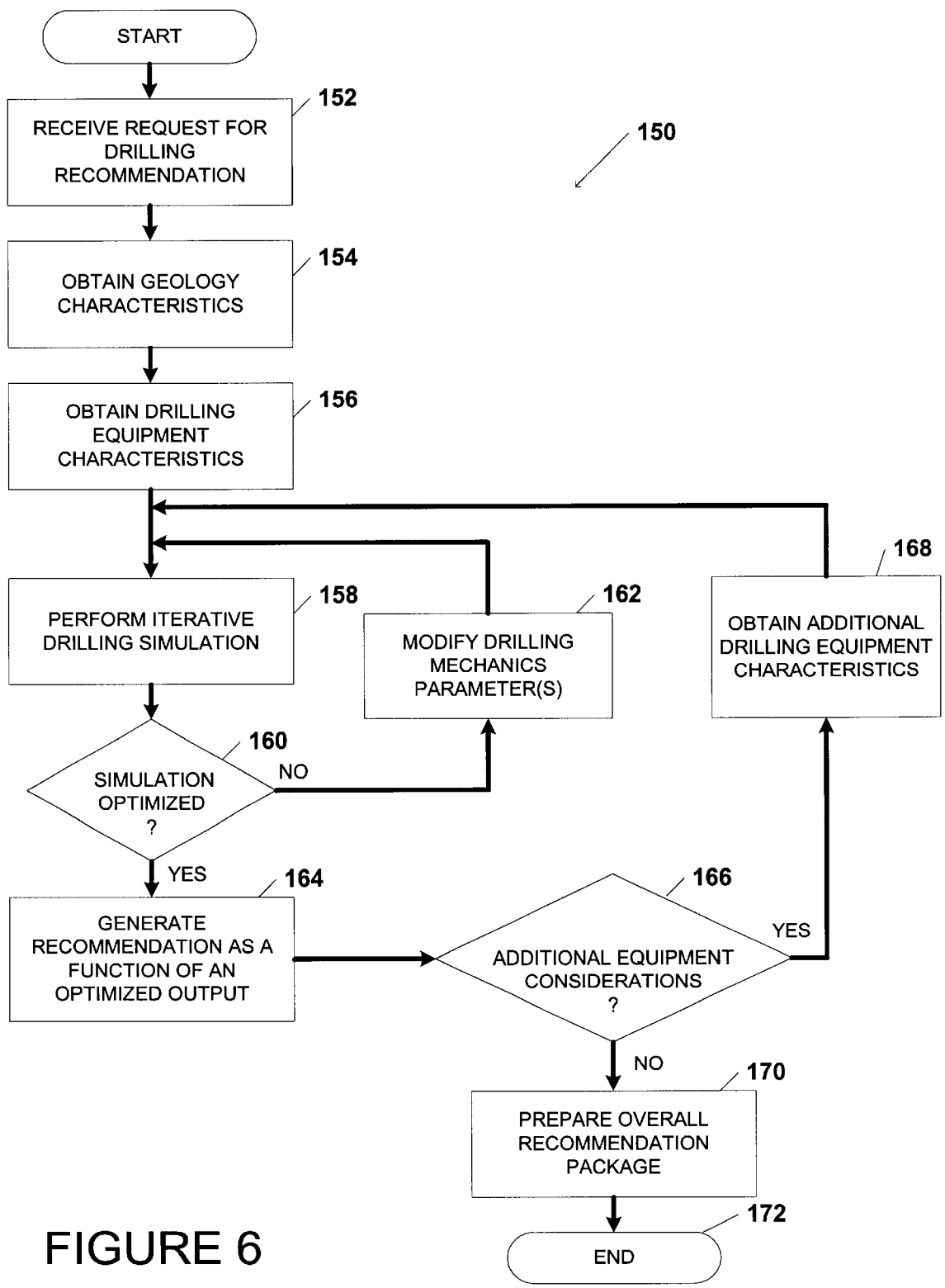
FIG. 6 is a flow diagram view of an iterative virtual drilling simulation method according to one embodiment.

Turning now to FIG. 6, FIG. 6 illustrates a flow diagram view of an iterative virtual drilling simulation method 150 with an iterative virtual drilling simulator 21 (FIG. 1) according to one embodiment of the present disclosure. In step 152, iterative virtual drilling simulator receives a request for a drilling recommendation in connection with facilitating enhanced economic decision making, further with respect to drilling of a well bore in a given formation characterized by a particular rock column. In step 154, the simulator obtains geology characteristics of the formation to be drilled, the geology characteristics including those as discussed earlier herein. In step 156, the simulator obtains drilling equipment characteristics of a drilling system, the drilling equipment characteristics including characteristics as discussed earlier herein.

In step 158, the simulator performs an iterative drilling simulation of the drilling of the well bore in the formation. The simulation of step 158 includes the producing of an economic evaluation factor for the respective iterative simulation. In step 160, the simulator queries whether or not the simulation is optimized, according to a prescribed optimization process and criteria for a given simulated drilling application. If not optimized, the process proceeds to step 162. In step 162, the simulator modifies one or more drilling mechanics parameter(s) according to the prescribed optimization process and criteria. Upon a modification of the one or more drilling mechanics parameters in step 162, the process returns to step 158 for performing an iterative drilling simulation as a function of the modified drilling mechanics parameters and the geology characteristics. The process continues as discussed herein with respect to step 158.

If, in step 160, the simulation is determined to be optimized, then the process proceeds to step 164. In step 164, the simulator generates a preliminary recommendation as a function of the optimized drilling simulation output for the respective iteration. In step 166, the simulator queries whether or not there are additional equipment considerations. If additional equipment considerations exist, then the process proceeds to step 168. In step 168, the simulator obtains the additional drilling equipment characteristics. The process then returns to step 158 for performing an iterative drilling simulation as a function of the additional drilling system equipment characteristics. The process continues as discussed herein with respect to step 158.

If, in step 166, there are no additional equipment considerations for the particular iterative drilling simulation process, then the simulator prepares an overall recommendation package at step 170, as discussed further herein. The process then ends at step 172.

Figure 7:
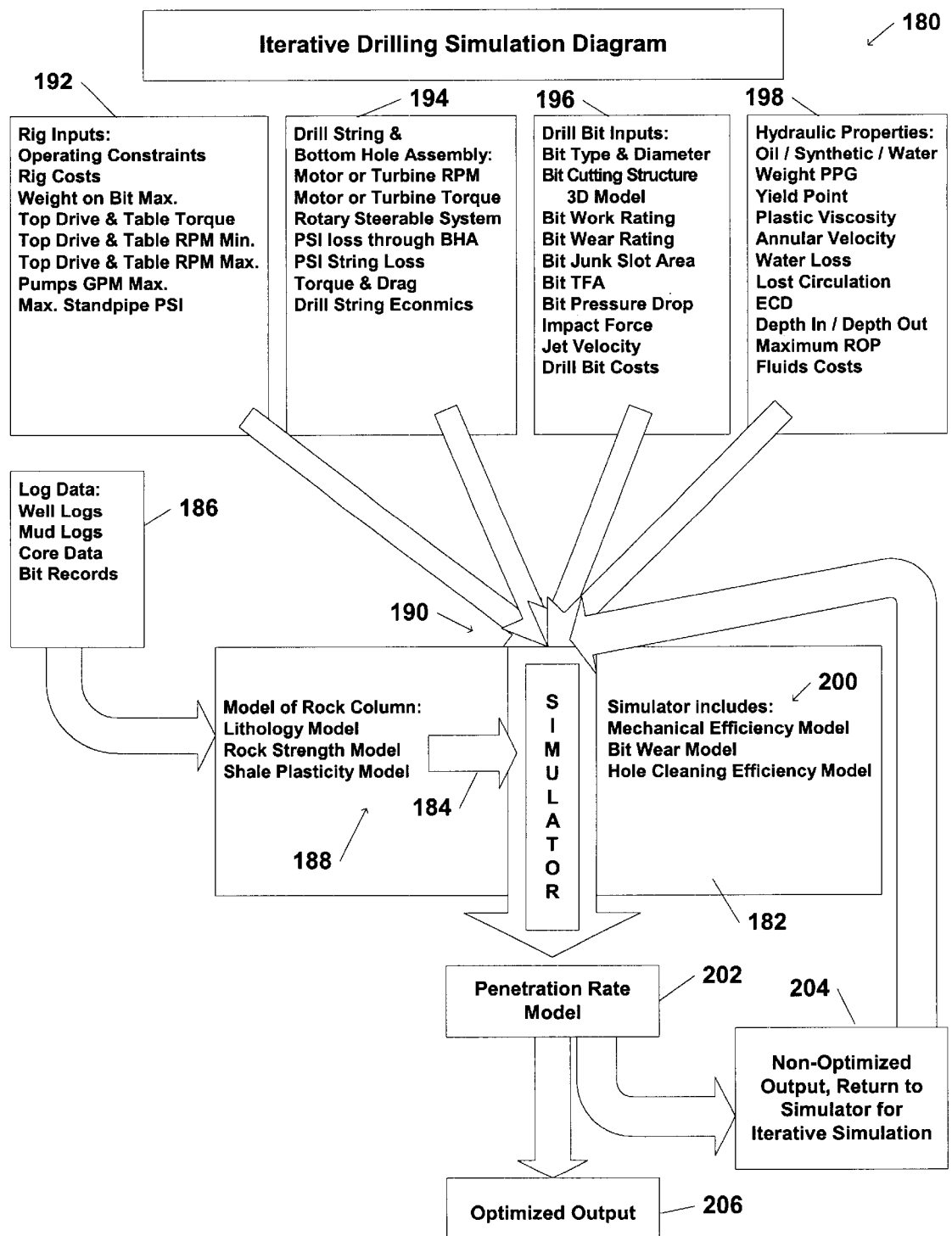
FIG. 7 is a block diagram view of an iterative drilling simulator according to another embodiment.

Turning now to FIG. 7, FIG. 7 illustrates a block diagram view of an iterative drilling simulator system 180 for performing iterative drilling simulations according to another embodiment of the present disclosure. The iterative drilling simulation system provides for enhanced economic decision making, as discussed herein. The iterative drilling simulation system 180 includes a simulator 182. The simulator 182 obtains characteristics of a rock column to be drilled via input 184. The characteristics of the rock column include one or more of lithology, rock strength, and shale plasticity. Any one of the rock column characteristics can be derived from log data 186 and a respective lithology model, rock strength model, and shale plasticity model, generally indicated by reference numeral 188.

Referring still to FIG. 7, the drilling simulator 182 obtains characteristics of a drilling rig system via drilling rig system input, generally indicated by reference numeral 190. The characteristics of the drilling rig system include one or more characteristics of rig inputs 192, drill string and bottom hole assembly inputs 194, drill bit inputs 196, and hydraulic properties 198. The drilling rig system characteristics may also include characteristics of more than one drilling rig system.

The rig inputs 192 may include one or more inputs of operating constraints, rig costs, maximum weight on bit, top drive torque, table drive torque, top drive minimum RPM, table drive minimum RPM, top drive maximum RPM, table drive maximum RPM, pumps maximum GPM, and standpipe maximum PSI. The drill sting and bottom hole assembly (BHA) characteristics 194 may include characteristics of motor RPM, turbine RPM, motor torque, turbine torque, rotary steerable system, PSI loss through BHA, PSI string loss, string torque, string drag, and drill string economics.

The drill bit inputs 196 may include one or more inputs of bit type, bit diameter, bit cutting structure 3D model, bit work rating, bit wear rating, bit junk slot area, bit TFA (total flow area), and bit pressure drop.

The hydraulic properties 198 may include one or more properties of oil, synthetic, water, weight PPG (pounds per gallon), yield point, plastic viscosity, annular velocity, water loss, lost circulation, ECD (equivalent circulating densities), depth in, depth out, maximum ROP, and fluid costs.

According to one embodiment, the simulator 182 (FIG. 7) includes a computer system 21 (FIG. 1) for performing the various functions as described herein. The various functions as discussed herein can be programmed using programming techniques well known in the art. The inputs can include any suitable input, whether analog, digital, optical, sonic, or other form of input, via an input device, such as a keyboard, interface card, or other suitable input device, for communicating the rock column and drilling rig system characteristics to simulator 182.

In response to obtaining characteristics of a rock column in a formation to be drilled and characteristics of at least one drilling rig system, the simulator 182 iteratively simulates the drilling of a well bore in the formation and produces an economic evaluation factor for each iteration of drilling simulation. Each iteration of drilling simulation is a function of the rock column and the characteristics of the at least one drilling rig system according to a drilling simulation model. According to one embodiment, the drilling simulation model includes one or more models of mechanical efficiency, bit wear, hole cleaning efficiency, and drilling economics, generally indicated by reference numeral 200, as discussed further herein. The drilling simulation model may also include a penetration rate model 202, as discussed further herein also.

As illustrated in FIG. 7, if an output of the penetration rate model 200 is not optimized, the simulator executes another iterative simulation, via 204. The iterative simulation would include a modification of one or more drilling rig system characteristics, prior to running a corresponding iteration, as may be appropriate for a given iterative drilling simulation plan. On the other hand, if an output of the penetration rate model 204 were satisfactory according to a given optimization criteria, then simulator 182 provides the optimum output at 206. Accordingly, simulator 182 would be finished with the given iterative drilling simulation exercise.

In addition to iteratively simulating the drilling of a well bore in the formation, the simulator 182 produces an economic evaluation factor for each iteration of drilling simulation. Each iteration of drilling simulation is a function of the rock column and the characteristics of the at least one drilling rig system according to a drilling simulation model.

The simulator 182 further generates a recommendation package of drilling rig system characteristics as a function of economic evaluation factors. The recommendation package information is presented in one or more of the following formats of hardcopy, CD ROM, computer readable media, electronic file, holographic projection, compressed time animation, or any combination thereof. Accordingly, the recommendation package includes information suitable for use in deciding upon equipment and process selections in an actual drilling of a well bore in the formation, as a function of the economic evaluation factors.

Figure 8:
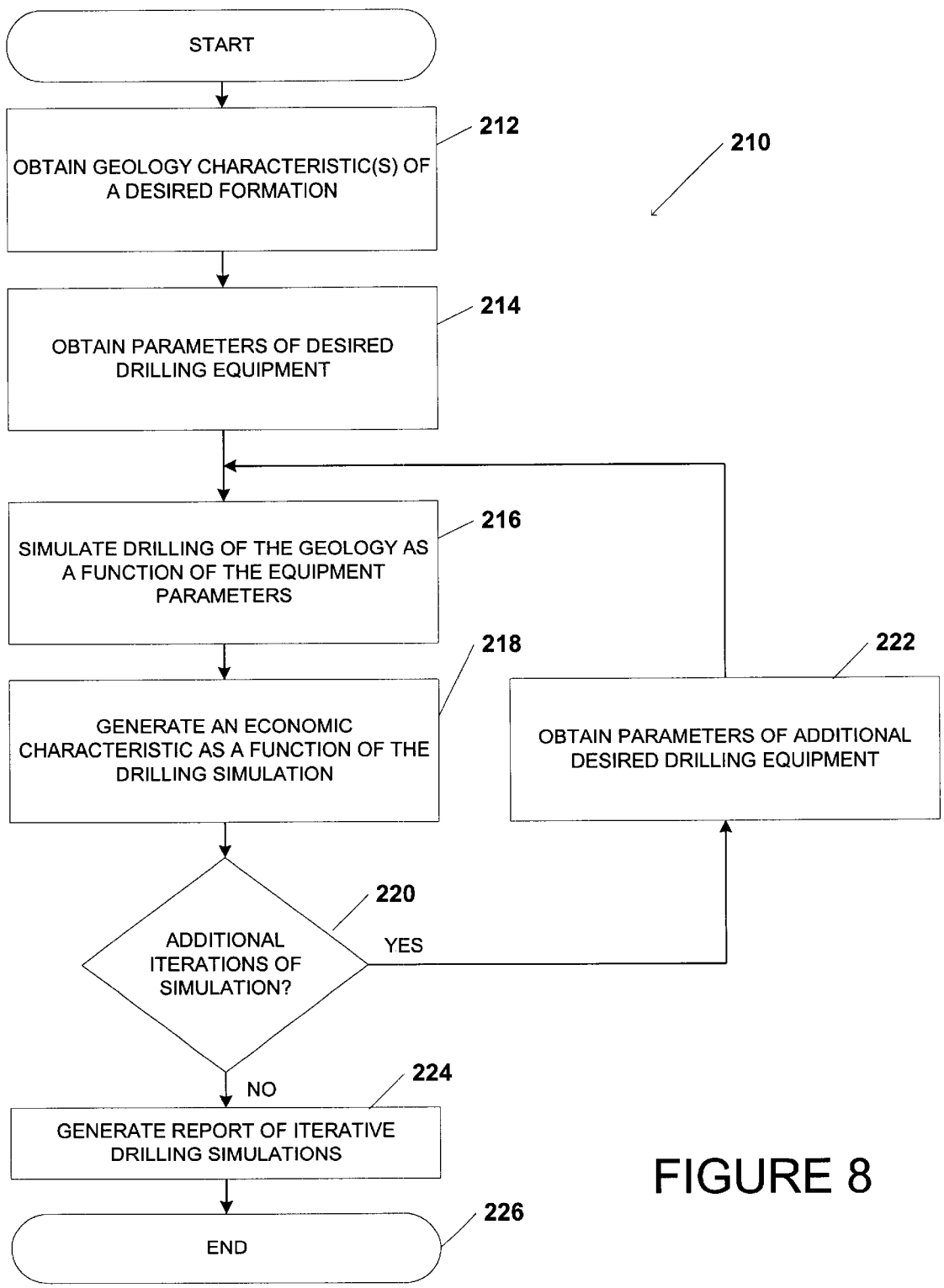
FIG. 8 is a flow diagram view of an iterative virtual drilling simulation method according to another embodiment.

FIG. 8 is a flow diagram view of an iterative drilling simulation method 210 according to another embodiment. In step 212, the iterative drilling simulation method obtains geology characteristic(s) of a desired formation. In step 214, the process includes obtaining parameters of desired drilling equipment. In step 216, the method simulates drilling of a well bore in the geology as a function of the geology and the drilling equipment parameters according to a prescribed drilling simulation model. In step 218, the method generates an economic characteristic as a function of the drilling simulation, the economic characteristic as further discussed herein.

In step 220, the process queries whether or not additional iterations of simulation are to be carried out. If additional iterations of simulations are to be conducted, then the process proceeds to step 222. In step 222, the process obtains parameters of additional desired drilling equipment. In response to obtaining the parameters of additional desired drilling equipment, the process returns to step 216 and the simulating of drilling the geology as a function of the geology and drilling equipment characteristics.

In step 220, if no additional simulations are to be conducted, then the process proceeds to step 224. In step 224, the process generates a report of the iterative drilling simulations, the report including suitable information for facilitating enhanced economic decision making in conjunction with drilling of a well bore in a given formation with a given drilling rig system, as discussed further herein. The process then ends at 226.

The embodiments of the present disclosure further include a method for preparing a recommendation package for enhanced economic decision making in connection with drilling at least one well bore in a given formation. The method comprises obtaining geology characteristics of the formation to be drilled. The geology characteristics include at least a rock column. The method further includes specifying equipment characteristics of at least one drilling system. The equipment characteristics include drilling mechanics parameters. Lastly, the method includes iteratively simulating the drilling of the well bore in the formation, producing an economic evaluation factor for each respective iterative drilling simulation and modifying drilling mechanics parameters until a desired optimization of the iterative drilling simulation is achieved.

Each iterative drilling simulation is a function of the geology and drilling system equipment characteristics according to a drilling simulation model. The method generates a preliminary recommendation in response to the iterative drilling simulation achieving the desired optimization. Still further, the method includes, repeating, for any additional equipment considerations, the steps of specifying equipment characteristics of at least one drilling system, iteratively simulating the drilling of the well bore, and generating a preliminary recommendation for any additional equipment considerations.

An overall recommendation is then generated as a function of the preliminary recommendations of iterative drilling simulations. For example, the recommendation package may be generated from the iterative drilling simulations as a function of economic evaluation factors of select ones of respective iterative drilling simulations. In one embodiment, the overall recommendation comprises one or more of hardcopy, CD ROM, computer readable media, electronic file, holographic projection, compressed time animation, or any combination thereof.

According to another embodiment, computer system 21 (FIG. 1) is programmed for performing functions as described herein, using programming techniques known in the art. In one embodiment, a computer program product includes a computer readable medium 37 (FIG. 1) having a computer program stored thereon. The computer program for execution by the computer enables iterative drilling simulation for enhanced economic decision making. The computer program includes instructions processable by the computer system for causing the computer system to obtain characteristics of a rock column in a formation to be drilled, obtain characteristics of at least one drilling rig system, and iteratively simulate the drilling of a well bore in the formation. The computer program is further for producing an economic evaluation factor for each iteration of drilling simulation, wherein each iteration of drilling simulation is a function of the rock column and the characteristics of the at least one drilling rig system according to a drilling simulation model.

The computer program is further processable by the computer system for causing the computer system to generate a simulated well bore drilling performance output for a given iteration of simulated drilling of the well bore, the simulated well bore drilling performance output suitable for facilitating an enhanced economic decision making with respect to an actual drilling with a respective drilling rig system in a field containing formations analogous to the rock column. The simulated well bore drilling performance output includes at least one of the following selected from the groups consisting of (a) identification of drilling rig system characteristics, the characteristics including at least a drilling rig system economic factor, (b) a representation of the well bore in the rock column, (c) a minimum duration of time needed on bottom to drill the well bore, and (d) a minimum cost amount determined as a function of the duration of time and the drilling rig system economic factor.

The computer program is still further processable by the computer system for causing the computer system to generate a simulated well bore drilling performance output for at least one iteration of the simulated drilling of the well bore. In one example, the simulated well bore drilling performance output facilitates enhanced economic decision making with respect to actual drilling in a field containing formations analogous to the rock column with a respective drilling rig system corresponding to that of the at least one iteration of the simulated well bore drilling performance.

According to another embodiment, the simulator iteratively simulates the drilling of the well bore in the formation, produces an economic evaluation factor for each respective iterative drilling simulation, and modifies drilling mechanics parameters until a desired optimization of the iterative drilling simulation is achieved. Each iterative drilling simulation is a function of the geology and drilling system equipment characteristics according to a drilling simulation model. The simulator further generates a preliminary recommendation in response to the iterative drilling simulation achieving the desired optimization. The simulator operates to repeat the specifying of equipment characteristics of at least one drilling system, iteratively simulating the drilling of the well bore, and generating a preliminary recommendation for any additional equipment considerations. Lastly, the simulator generates an overall recommendation as a function of the preliminary recommendations of iterative drilling simulations.

According to another embodiment, a system for preparing a recommendation package for enhanced economic decision making in connection with drilling at least one well bore in a given formation comprises a first input, a second input, and a simulator. The first input is for obtaining geology characteristics of the formation to be drilled, wherein the geology characteristics include at least a rock column. The second input is for specifying equipment characteristics of at least one drilling system, wherein the equipment characteristics include drilling mechanics parameters. Lastly, the simulator is for simulating the drilling of the well bore in the formation, wherein the drilling simulation is a function of the geology and drilling system equipment characteristics according to a drilling simulation model.

The simulator generates an economic evaluation factor as a function of the drilling simulation. In addition, the simulator operates to iteratively repeat, for any additional equipment considerations, the specifying of equipment characteristics, simulating the drilling of the well bore, and generating the economic evaluation factor. The simulator further generates a recommendation package of the iterative drilling simulations as a function of economic evaluation factors of select ones of respective iterative drilling simulations, as discussed.

According to another embodiment, a simulator for enhanced economic decision making in connection with drilling at least one well bore in a given formation comprises a first processor, a second processor, and a third processor. In one embodiment, the first, second, and third processors may include a single processor for performing the functionality's as discussed herein.

The first processor, responsive to geology characteristics of the formation to be drilled and specified equipment characteristics of at least one drilling system, iteratively simulates the drilling of a well bore in a formation. The geology characteristics include at least a rock column and the equipment characteristics include the drilling mechanics parameters. The first processor further produces an economic evaluation factor for each respective iterative drilling simulation. The first processor also modifies drilling mechanics parameters until a desired optimization of the iterative drilling simulation is achieved. Each iterative drilling simulation is a function of the geology and drilling system equipment characteristics according to a prescribed drilling simulation model.

The second processor, responsive to the achievement of the desired optimization by the first processor, generates a preliminary recommendation. The first and second processors further operate in response to the geology characteristic and any additional specified equipment characteristics of the at least one drilling system for iteratively simulating the drilling of the well bore and generating a preliminary recommendation for any such additional equipment considerations as a function of one or more economic evaluation factors.

Responsive to iterative simulations of drilling and generating of preliminary recommendations for the initial and any additional equipment considerations, the third processor generates an overall recommendation as a function of the preliminary recommendations of iterative drilling simulations. The third processor may also generate a recommendation package of the iterative drilling simulations as a function of economic evaluation factors of select ones of respective iterative drilling simulations. The overall recommendation package content may be in a format that includes hardcopy, CD ROM, computer readable media, electronic file, holographic projection, compressed time animation, or any combination thereof.

As discussed herein, the geology and drilling mechanics models of the present iterative simulation method and system digest an existing suite of logs. The iterative drilling simulation method and system are also characterized by an open architecture that can be readily upgraded to reflect any impact that a new technology may have on the economics of an iterative simulation. In addition to the above discussion, the iterative drilling simulation method and system includes capabilities for being upgraded to reflect new technology advancements as they are developed and made generally available. For example, the iterative drilling simulation method and system can be upgraded to take into account technical advancements in one or more of the rig equipment, torque and drag mitigation equipment, downhole rotary systems, rock destruction tools, drill bit enhancements, and other related technology developments. Accordingly, it is anticipated that as technology advances, the iterative drilling simulation method and system can be modified to reflect any impact of the new technology on the economics of a given iterative simulation.

ILLUSTRATIVE EXAMPLES

The following description provides various illustrative examples of applicability with respect to the embodiments of the present disclosure.

Rig Selection

According to one embodiment, the drilling simulator of the present disclosure is useful with respect to rig selection. For example, consider a situation in which a drilling operator has discovered and delineated a new offshore field. The operator now intends to develop the field. The operator has a choice of two available drill rigs to put under contract to accomplish the developmental drilling. A first rig ("Rig One") is available at $200,000 per day and a second rig ("Rig Two") is available at $175,000 per day. Rough estimates made by the operator indicate that the operator expects developmental drilling to take three (3) years. Accordingly, the operator seeks to contract a rig for the three (3) year period of time.

Traditional decision making methods used to determine which rig to contract involve estimating or approximating which rig will be most effective through various macro observations of horsepower, pumping power, and weight handling capability relative to the daily cost. From these estimates, a contractor decides which rig to contract.

Using the simulation method of the present disclosure, according to one embodiment, the simulator creates a computerized simulation of each rig and the respective rig's capabilities relative to the particular rock column to be drilled. The characteristics of the rock to be drilled are simulated using log data gathered from one or more discovery and/or delineation wells. With respect to each rig's particular characteristics, the drilling simulator iteratively produces drilling simulations until an "optimum" drilling approach for the specific rock column for each rig's particular characteristics is determined. These simulations can then be used to allow the operator to make a much better informed decision as to which rig will ultimately provide a best overall economic value in the development of the particular field.

In the above example, the difference of $25,000 per day over the projected 3 year life of the rig contract equals $27,375,000. Accordingly, the potential economic implications of the decision are clearly significant.

Rig Modification/Upgrade Valuations

Drilling rigs are comprised of various components that represent the total energy input capabilities that a respective rig can apply to the drilling of a well bore. The rig components include, but are not limited to, the rotary table, top drive, drill string, drilling fluid pumps, bottom hole assembly, and hoisting equipment. As a given rig ages, some of the rig components lose efficiency. For instance, this is especially true of the potential of the drill string to accept rotary input, torque, and weight, and of the drilling fluid pumps to operate at or near the manufacturer's original efficiency rating. Replacing these rig components to re-attain their original capabilities with respect to the overall drilling rig system can be an expensive proposition.

The simulation capabilities provided by the process of the present disclosure enable an analyst to iteratively run through various scenarios of drilling before and after potential rig upgrades or component replacements. Accordingly, the analyst can more effectively determine an economic impact of actually making a corresponding upgrade or replacement, or of delaying doing so.

For example, the present embodiments can be used for assisting in making a multi-million dollar decision whether or not to replace the drilling tubulars of a given drilling rig with new drilling tubulars. By modeling the loss of weight and torque capabilities of an existing drill string in a proposed drilling environment versus the higher weight and torque capabilities of a new drill string, a far clearer picture of the economic benefits of the new tubulars versus their cost can be derived. For a specific drilling campaign, a rig contractor may consider using the simulation results to aid in convincing a contracting operator to share in the cost of a new drill string, wherein the operator's ultimate drilling costs would be significantly reduced by the employment of the new system capabilities resulting from the new drill tubulars.

Asset Comparisons/Field Economics

Operating companies make decisions on whether or not to develop a hydrocarbon bearing prospect based on a simulation of the reservoir, value of the hydrocarbon to be produced, logistics costs, and an estimate of drilling costs. The present invention, allowing for a scientifically based simulation of the drilling system and it's respective efficiencies, provides the operator with a much more reliable way of factoring the economic aspects of drilling costs into the decision making process.

Specifically, by using a simulation according to the present embodiments rather than an estimation, a decision could swing to developing a field, rather than abandoning its development as not being economically feasible.

Given that a simulation, according to the present embodiments, can be used to assist in the economic evaluation of an individual prospective asset, such a simulation can by extension be used to make comparisons of the economics of multiple prospective assets. Accordingly, the simulation method of the present disclosure assists in determining which of multiple prospective assets should be developed and in what order they should be developed.

DHM (Down Hole Motor) vs Rotary Steerable vs Turbine Evaluations

Drilling system components that provide down hole rotation enhancements and/or directional drilling control methods represent an expensive addition to an overall drilling system. The simulation system of the present embodiments make it possible to iteratively compare downhole performance and ultimate economics of the various available down hole rotation and/or directional drilling control drilling system components. Exemplary drilling system components may include, for example, down hole motor, rotary steerable system, downhole turbine, or other similar component.

From an operator's viewpoint, having a simulation makes it possible to arrive at the best possible system for the drilling project ahead, prior to an initial developmental well. The simulation also enables avoiding the expense of "field testing" of various systems to eventually reach a preferred method, wherein the method of "field testing" may or may not produce an optimum method.

Contractor Pricing/Qualification Consulting

Rig contractors manage fleets of drilling rigs of various ratings, capabilities, and wear conditions. According to one embodiment of the present disclosure, the simulator enables cross-analyses of the capabilities of some or all of the subject rig fleet to be performed, allowing a contractor to determine which members of a given fleet are best suited for a particular drilling challenge or challenges. In addition, the contractor can use the simulation outputs for determining appropriate upgrade strategies and upgrade timing decisions. Decisions to build a new rig versus refurbishing an existing rig can also be positively impacted by use of embodiments of the simulator method and apparatus of the present disclosure.

With access to the embodiments of the present disclosure, a rig contractor can use the simulations or simulation data outputs produced by the simulator in contract negotiations with drilling operators to provide further information as to the "fit-for-purpose" nature of a particular rig or rigs. The leverage provided by the simulation should allow the contractor an ability to negotiate better financial terms for the lease of the particular rig or rigs.

Drilling Fluids Selection and Economic Impact

According to another embodiment, the simulator takes into account properties of the drilling fluid to be used in a drilling process, relative to the formation(s) to be drilled. Such a capability allows the simulator output to be used to make decisions on drilling fluids economics, drilling fluids selection and additional hydraulics parameters to be used in a given drilling process.

Drilling Parameter Recommendations

If during the course of a developmental drilling campaign, an operator determines that drilling costs are unacceptably high, then there is a likelihood that steps will be taken to reduce drilling costs. One basic approach to reduce drilling costs (as well as reduce overall cost) is to improve drilling efficiency.

According to another embodiment of the present disclosure, the simulator iteratively models drilling efficiencies. That is, the simulator provides opportunities for improved drilling efficiency to be iteratively modeled and analyzed by using various sets of drilling parameter inputs and bit models. The best way forward in the reduction of drilling costs can then be identified and implemented without the ongoing expense of "field trials" to attempt, either successfully or unsuccessfully, to reduce drilling costs.

Time to First Economic Production Evaluations

Operators use determinations of time to first economic hydrocarbon production to assist them in determining a net present value of a developmental prospect. An output of the simulator of the present embodiments provides a more accurate estimate of drilling times than previous estimation methods. The greater accuracy provided by the simulator of the present embodiments allows an operator to generate a better determination as to what an actual time will be to first economic hydrocarbon production.

Infield Drilling Economics

Infield drilling is performed to obtain additional production from fields that have previously been producing. Because the field has seen previous drilling, the assumption is generally made that drilling times for the infield drilling will generally be close to the earlier drilling. A simulation according to the present embodiments can be carried out to either verify the typical assumption, or to iteratively improve under simulated conditions, valuable drilling efficiencies prior to or early on in the commencement of the infield drilling.

Lease and Drilling Cost Evaluations

Nations from time to time offer leased mineral rights to properties for hydrocarbon exploration. Operators evaluate the properties based on seismic analyses to determine if the properties are of interest and for developing a bid price that the operator will offer for a corresponding lease or leases. Operators may also offer lease rights, that they already hold, to others from time to time. With use of the simulator embodiments of the present disclosure, a more accurate estimate of likely drilling costs for a given lease can be made. Accordingly, the present embodiments assist an operator in determining an appropriate bid price to offer for a given lease or leases.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. An iterative drilling simulation method for enhanced economic decision making comprising:
    obtaining characteristics of a rock column in a formation to be drilled;
    specifying characteristics of at least one drilling rig system; and
    iteratively simulating the drilling of a well bore in the formation and producing an economic evaluation factor for each iteration of drilling simulation, wherein each iteration of drilling simulation is a function of the rock column and the characteristics of the at least one drilling rig system according to a prescribed drilling simulation model.

2. The method of claim 1, wherein the economic evaluation factor includes a minimum number of hours on bottom to drill the well bore.

3. The method of claim 1, wherein the economic evaluation factor includes a minimum cost amount for drilling the well bore, and wherein the minimum cost amount is a function of both a minimum number of hours on bottom to drill the well bore and a cost per day for a respective drilling rig system.

4. The method of claim 1, wherein the well bore comprises sections of well bore, and wherein the economic evaluation factor includes a minimum number of hours on bottom to drill a respective section of well bore.

5. The method of claim 1, wherein the well bore comprises sections of well bore, and each section is characterized by a minimum number of hours on bottom to drill a respective section of well bore, and wherein the economic evaluation factor includes a cumulative minimum number of hours on bottom to drill the respective sections of well bore.

6. The method of claim 1, wherein the characteristics of the rock column include at least one of the following selected from the group consisting of lithology, rock strength, shale plasticity, log data, and porosity.

7. The method of claim 1, wherein the characteristics of the rock column include at least one of the following selected from the group consisting of lithology, rock strength, and shale plasticity, wherein a respective characteristic is derived from log data and a respective lithology model, rock strength model, and shale plasticity model, further wherein the log data includes at least one of the following selected from the group consisting of well logs, mud logs, core data, and bit records.

8. The method of claim 1, wherein the characteristics of the at least one drilling rig system include at least one of the following selected from the group consisting of rig inputs, drill string and bottom hole assembly, drill bit inputs, and hydraulic properties.

9. The method of claim 8, wherein the rig inputs include at least one of the following selected from the group consisting of operating constraints, rig costs, maximum weight on bit, top drive torque, table drive torque, top drive minimum RPM (revolutions per minute), table drive minimum RPM, top drive maximum RPM, table drive maximum RPM, maximum GPM (gallons per minute) for pumps, and standpipe maximum PSI (pounds per square inch).

10. The method of claim 8, wherein the drill string and bottom hole assembly (BHA) characteristics include at least one of the following selected from the group consisting of motor RPM (revolutions per minute), turbine RPM, motor torque, turbine torque, rotary steerable system, PSI (pounds per square inch) loss through BHA, PSI string loss, string torque, string drag, and drill string economics.

11. The method of claim 8, wherein the drill bit inputs include at least one of the following selected from the group consisting of bit type, bit diameter, bit cutting structure 3D (three dimensional) model, bit work rating, bit wear rating, bit junk slot area, bit TFA (total flow area), and bit pressure drop.

12. The method of claim 8, wherein the hydraulic properties include at least one of the following selected from the group consisting of oil, synthetic, water, weight PPG (pounds per gallon), yield point, plastic viscosity, annular velocity, water loss, lost circulation, ECD (equivalent circulating densities), depth in, depth out, maximum ROP (rate of penetration), and fluid costs.

13. The method of claim 1, wherein the characteristics of the at least one drilling rig system include at least one of the following selected from the group consisting of a bit specification, down hole motor, top drive system, rotary table, mud system, mud pump, hydraulics, and operating parameters.

14. The method of claim 13, wherein the operating parameters include at least one of the following selected from the group consisting of weight-on-bit, rotary RPM (revolutions per minute), cost per day, rate of penetration, torque, and pump flow rate.

15. The method of claim 1, further comprising:
generating a simulated well bore drilling performance output for a given iteration of simulated drilling of the well bore, the simulated well bore drilling performance output suitable for facilitating an enhanced economic decision making with respect to an actual drilling with a respective drilling rig system in a field containing formations analogous to the rock column.

16. The method of claim 15, wherein the simulated well bore drilling performance output includes at least one of the following selected from the group consisting of (a) identification of drilling rig system characteristics, the characteristics including at least a drilling rig system economic factor, (b) a representation of at least one section of well bore in the rock column, (c) a minimum duration of time needed on bottom to drill a respective at least one section of well bore, (d) a cumulative duration of time needed to drill all sections of well bore, and (e) a minimum cost amount determined as a function of the cumulative duration of time and the drilling rig system economic factor.

17. The method of claim 15, wherein the simulated well bore drilling performance output includes at least one of the following selected from the group consisting of (a) identification of drilling rig system characteristics, the characteristics including at least a drilling rig system economic factor, (b) a representation of the well bore in the rock column, (c) a minimum duration of time needed on bottom to drill the well bore, and (d) a minimum cost amount determined as a function of the duration of time and the drilling rig system economic factor.

18. The method of claim 1, further comprising:
generating a simulated well bore drilling performance output for at least one iteration of the simulated drilling of the well bore, the simulated well bore drilling performance output facilitating enhanced economic decision making with respect to an actual drilling in a field containing formations analogous to the rock column with a respective drilling rig system corresponding to that of the at least one iteration of the simulated drilling of the well bore.

19. The method of claim 1, wherein the drilling simulation model includes at least one of the following selected from the group consisting of a mechanical efficiency model, bit wear model, hole cleaning efficiency model, penetration rate model, and drilling economics model.

20. An iterative drilling simulation method for enhanced economic decision making comprising:
obtaining characteristics of a rock column in a formation to be drilled, wherein the characteristics of the rock column include at least one of the following selected from the group consisting of lithology, rock strength, and shale plasticity, wherein a respective characteristic is derived from log data and a respective lithology model, rock strength model, and shale plasticity model, further wherein the log data includes at least one of the following selected from the group consisting of well logs, mud logs, core data, and bit records;
specifying characteristics of at least one drilling rig system, wherein the characteristics of the at least one drilling rig system include at least one of the following consisting of rig inputs, drill string and bottom hole assembly inputs, drill bit inputs, and hydraulic properties,
wherein the rig inputs include operating constraints, rig costs, maximum weight on bit, top drive torque, table drive torque, top drive minimum RPM, table drive minimum RPM, top drive maximum RPM, table drive maximum RPM, pumps maximum GPM, and standpipe maximum PSI,
wherein the drill sting and bottom hole assembly (BHA) characteristics include at least one of the following selected from the group consisting of motor RPM, turbine RPM, motor torque, turbine torque, rotary steerable system, PSI loss through BHA, PSI string loss, string torque, string drag, and drill string economics,
wherein the drill bit inputs include at least one of the following selected from the group consisting of bit type, bit diameter, bit cutting structure 3D model, bit work rating, bit wear rating, bit junk slot area, bit TFA (total flow area), and bit pressure drop, and
wherein the hydraulic properties include at least one of the following selected from the group consisting of oil, synthetic, water, weight PPG (pounds per gallon), yield point, plastic viscosity, annular velocity, water loss, lost circulation, ECD (equivalent circulating densities), depth in, depth out, maximum ROP, and fluid costs;
iteratively simulating the drilling of a well bore in the formation and producing an economic evaluation factor for each iteration of drilling simulation, wherein each iteration of drilling simulation is a function of the rock column and the characteristics of the at least one drilling rig system according to a prescribed drilling simulation model, wherein the drilling simulation model includes at least one of the following selected from the group consisting of a mechanical efficiency model, bit wear model, hole cleaning efficiency model, penetration rate model, and drilling economics model; and
generating a recommendation package of drilling rig system characteristics for use in an actual drilling of a well bore in the formation as a function of the economic evaluation factors.

21. A method for enhanced economic decision making in connection with drilling at least one well bore in a given formation comprising:
obtaining characteristics of a rock column in the formation to be drilled;

specifying characteristics of at least one drilling rig system;

iteratively simulating the drilling of the well bore in the formation and producing an economic evaluation factor for each iteration of drilling simulation, wherein each iteration of drilling simulation is a function of the rock column and the characteristics of the at least one drilling rig system according to a drilling simulation model; and generating a recommendation package of drilling rig system characteristics for use in an actual drilling of a well bore in the formation as a function of the economic evaluation factors.

22. The method of claim 21, wherein the recommendation package includes at least one of the following selected from the group consisting of hardcopy, CD ROM, computer readable media, electronic file, holographic projection, compressed time animation, and any combination thereof.

23. The method of claim 21, wherein the drilling rig system characteristics include characteristics of more than one drilling rig system.

24. A recommendation package for enhancing economic decision making in connection with drilling at least one well bore in a given formation, the recommendation package comprising:

at least one economic evaluation factor; and at least one recommendation of drilling rig system characteristics for use in an actual drilling of the at least one well bore in the formation as a function of the economic evaluation factors; wherein said at least one economic evaluation factor having been derived by a method that includes:

obtaining characteristics of a rock column in the formation to be drilled;

specifying characteristics of at least one drilling rig system; and iteratively simulating the drilling of the well bore in the formation and producing an economic evaluation factor for each iteration of drilling simulation, wherein each iteration of drilling simulation is a function of the rock column and the characteristics of the at least one drilling rig system according to a drilling simulation model.

25. The recommendation package of claim 24, further comprising at least one of the following selected from the group consisting of hardcopy, CD ROM, computer readable media, electronic file, holographic projection, compressed time animation, and any combination thereof.

26. A method for preparing a recommendation package for enhanced economic decision making in connection with drilling at least one well bore in a given formation, the method comprising:

obtaining geology characteristics of the formation to be drilled, the geology characteristics including at least a rock column;

specifying equipment characteristics of at least one drilling system, the equipment characteristics including drilling mechanics parameters;

iteratively simulating the drilling of the well bore in the formation, producing an economic evaluation factor for each respective iterative drilling simulation and modifying drilling mechanics parameters until a desired optimization of the iterative drilling simulation is achieved, wherein each iterative drilling simulation is a function of the geology and drilling system equipment characteristics according to a drilling simulation model;

generating a preliminary recommendation in response to the iterative drilling simulation achieving the desired optimization;

repeating, for any additional equipment considerations, the steps of specifying equipment characteristics of at least one drilling system, iteratively simulating the drilling of the well bore, and generating a preliminary recommendation for any additional equipment considerations; and generating an overall recommendation as a function of the preliminary recommendations of iterative drilling simulations.

27. The method of claim 26, wherein the overall recommendation comprises at least one of the following selected from the group consisting of hardcopy, CD ROM, computer readable media, electronic file, holographic projection, compressed time animation, and any combination thereof.

28. A method for preparing a recommendation package for enhanced economic decision making in connection with drilling at least one well bore in a given formation, the method comprising:

obtaining geology characteristics of the formation to be drilled, the geology characteristics including at least a rock column;

specifying equipment characteristics of at least one drilling system, the equipment characteristics including drilling mechanics parameters;

simulating the drilling of the well bore in the formation, wherein the drilling simulation is a function of the geology and drilling system equipment characteristics according to a drilling simulation model;

generating an economic evaluation factor as a function of the drilling simulation;

iteratively repeating, for any additional equipment considerations, the steps of specifying equipment characteristics, simulating the drilling of the well bore, and generating an economic evaluation factor; and generating a recommendation package of the iterative drilling simulations as a function of economic evaluation factors of select ones of respective iterative drilling simulations.

29. The method of claim 28, wherein the recommendation package comprises at least one of the following selected from the group consisting of hardcopy, CD ROM, computer readable media, electronic file, holographic projection, and any combination thereof.

30. A computer program stored on a computer-readable medium for enabling iterative drilling simulation for enhanced economic decision making, said computer program processable by a computer system for causing the computer system to:

obtain characteristics of a rock column in a formation to be drilled;

obtain characteristics of at least one drilling rig system; and iteratively simulate the drilling of a well bore in the formation and produce an economic evaluation factor for each iteration of drilling simulation, wherein each iteration of drilling simulation is a function of the rock column and the characteristics of the at least one drilling rig system according to a drilling simulation model.

31. The computer program of claim 30, wherein the economic evaluation factor includes a minimum cost amount for drilling the well bore, and wherein the minimum cost amount is a function of both a minimum number of hours on bottom to drill the well bore and a cost per day for a respective drilling rig system.

32. The computer program of claim 30, wherein the well bore comprises sections of well bore, and wherein the economic evaluation factor includes a minimum number of hours on bottom to drill a respective section of well bore.

33. The computer program of claim 30, wherein the well bore comprises sections of well bore, and each section is characterized by a minimum number of hours on bottom to drill a respective section of well bore, and wherein the economic evaluation factor includes a cumulative minimum number of hours on bottom to drill the respective sections of well bore.

34. The computer program of claim 30, wherein the characteristics of the rock column include at least one selected from the group consisting of lithology, rock strength, shale plasticity, log data, and porosity.

35. The computer program of claim 30, wherein the characteristics of the at least one drilling rig system include at least one selected from the group consisting of a bit specification, down hole motor, top drive system, rotary table, mud system, mud pump, hydraulics, and operating parameters.

36. The computer program of claim 35, wherein the operating parameters include at least one selected from the group consisting of weight-on-bit, rotary RPM (revolutions per minute), cost per day, rate of penetration, torque, and pump flow rate.

37. The computer program of claim 30, wherein the computer program is further processable by the computer system for causing the computer system to:
generate a simulated well bore drilling performance output for a given iteration of simulated drilling of the well bore, the simulated well bore drilling performance output suitable for facilitating an enhanced economic decision making with respect to an actual drilling with a respective drilling rig system in a field containing formations analogous to the rock column.

38. The computer program of claim 37, wherein the simulated well bore drilling performance output includes at least one selected from the groups consisting of (a) identification of drilling rig system characteristics, the characteristics including at least a drilling rig system economic factor, (b) a representation of the well bore in the rock column, (c) a minimum duration of time needed on bottom to drill the well bore, and (d) a minimum cost amount determined as a function of the duration of time and the drilling rig system economic factor.

39. The computer program of claim 30, wherein the computer program is further processable by the computer system for causing the computer system to:
generate a simulated well bore drilling performance output for at least one iteration of the simulated drilling of the well bore, the simulated well bore drilling performance output facilitating enhanced economic decision making with respect to actual drilling in a field containing formations analogous to the rock column with a respective drilling rig system corresponding to that of the at least one iteration of the simulated well bore drilling performance.

40. An iterative drilling simulation system for enhanced economic decision making comprising:
a first input for obtaining characteristics of a rock column in a formation to be drilled;
a second input for specifying characteristics of at least one drilling rig system; and
a simulator for iteratively simulating the drilling of a well bore in the formation and producing an economic evaluation factor for each iteration of drilling simulation, wherein each iteration of drilling simulation is a function of the rock column and the characteristics of the at least one drilling rig system according to a drilling simulation model.

41. The system of claim 40, wherein the economic evaluation factor includes a minimum number of hours on bottom to drill the well bore.

42. The system of claim 40, wherein the economic evaluation factor includes a minimum cost amount for drilling the well bore, and wherein the minimum cost amount is a function of both a minimum number of hours on bottom to drill the well bore and a cost per day for a respective drilling rig system.

43. The system of claim 40, wherein the well bore comprises sections of well bore, and each section is characterized by a minimum number of hours on bottom to drill a respective section of well bore, and wherein the economic evaluation factor includes a cumulative minimum number of hours on bottom to drill the respective sections of well bore.

44. The system of claim 40, wherein the characteristics of the rock column include at least one of the following selected from the group consisting of lithology, rock strength, shale plasticity, log data, and porosity.

45. The system of claim 40, wherein the characteristics of the at least one drilling rig system include at least one of the following selected from the group consisting of a bit specification, down hole motor, top drive system, rotary table, mud system, mud pump, hydraulics, and operating parameters.

46. The system of claim 45, wherein the operating parameters include at least one of the following selected from the group consisting of weight-on-bit, rotary RPM (revolutions per minute), cost per day, rate of penetration, torque, and pump flow rate.

47. The system of claim 40, wherein said simulator is further for generating a simulated well bore drilling performance output for at least one iteration of simulated drilling of the well bore, the simulated well bore drilling performance output suitable for facilitating an enhanced economic decision making with respect to an actual drilling with a respective drilling rig system in a field containing formations analogous to the rock column.

48. The system of claim 47, wherein the simulated well bore drilling performance output includes at least one of the following selected from the group consisting of (a) identification of drilling rig system characteristics, the characteristics including at least a drilling rig system economic factor, (b) a representation of the well bore in the rock column, (c) a minimum duration of time needed on bottom to drill the well bore, and (d) a minimum cost amount determined as a function of the duration of time and the drilling rig system economic factor.

49. An iterative drilling simulation system for enhanced economic decision making comprising:
first input for obtaining characteristics of a rock column in a formation to be drilled, wherein the characteristics of the rock column include at least one of the following selected from the group consisting of lithology, rock strength, and shale plasticity, wherein a respective characteristic can be derived from log data and a respective lithology model, rock strength model, and shale plasticity model;
second input for specifying characteristics of at least one drilling rig system; wherein the characteristics of the at least one drilling rig system include at least one of the following selected from the group consisting of rig inputs, drill string and bottom hole assembly inputs, drill bit inputs, and hydraulic properties, wherein the rig inputs include at least one of the following selected from the group consisting of operating constraints, rig costs, maximum weight on bit, top drive torque, table drive torque, top drive minimum RPM, table drive minimum RPM, top drive maximum RPM, table drive maximum RPM, pumps maximum GPM, and standpipe maximum PSI, wherein the drill sting and bottom hole assembly (BHA) characteristics include at least one of the following selected from the group consisting of motor RPM, turbine RPM, motor torque, turbine torque, rotary steerable system, PSI loss through BHA, PSI string loss, string torque, string drag, and drill string economics, wherein the drill bit inputs include at least one of the following selected from the group consisting of bit type, bit diameter, bit cutting structure 3D model, bit work rating, bit wear rating, bit junk slot area, bit TFA (total flow area), and bit pressure drop, wherein the hydraulic properties include at least one of the following selected from the group consisting of oil, synthetic, water, weight PPG (pounds per gallon), yield point, plastic viscosity, annular velocity, water loss, lost circulation, ECD (equivalent circulating densities), depth in, depth out, maximum ROP, and fluid costs; and a simulator for iteratively simulating the drilling of a well bore in the formation and producing an economic evaluation factor for each iteration of drilling simulation, wherein each iteration of drilling simulation is a function of the rock column and the characteristics of the at least one drilling rig system according to a drilling simulation model, wherein the drilling simulation model includes at least one of the following selected from the group consisting of a mechanical efficiency model, bit wear model, hole cleaning efficiency model, penetration rate model, and drilling economics model, said simulator further for generating a recommendation package of drilling rig system characteristics for use in an actual drilling of a well bore in the formation as a function of the economic evaluation factors.

50. A system for enhanced economic decision making in connection with drilling at least one well bore in a given formation comprising:

first input for obtaining characteristics of a rock column in the formation to be drilled;

second input for specifying characteristics of at least one drilling rig system; and a simulator for iteratively simulating the drilling of the well bore in the formation and producing an economic evaluation factor for each iteration of drilling simulation, wherein each iteration of drilling simulation is a function of the rock column and the characteristics of the at least one drilling rig system according to a drilling simulation model, said simulator further for generating a recommendation package of drilling rig system characteristics for use in an actual drilling of a well bore in the formation as a function of the economic evaluation factors.

51. The system of claim 50, wherein the recommendation package includes at least one of the following selected from the group consisting of hardcopy, CD ROM, computer readable media, electronic file, holographic projection, compressed time animation, and any combination thereof.

52. The system of claim 50, wherein the drilling rig system characteristics include characteristics of more than one drilling rig system.

53. A system for preparing a recommendation package for enhanced economic decision making in connection with drilling at least one well bore in a given formation, said system comprising:

first input for obtaining geology characteristics of the formation to be drilled, the geology characteristics including at least a rock column;

second input for specifying equipment characteristics of at least one drilling system, the equipment characteristics including drilling mechanics parameters; and a simulator for iteratively simulating the drilling of the well bore in the formation, producing an economic evaluation factor for each respective iterative drilling simulation and modifying drilling mechanics parameters until a desired optimization of the iterative drilling simulation is achieved, wherein each iterative drilling simulation is a function of the geology and drilling system equipment characteristics according to a drilling simulation model, said simulator further for generating a preliminary recommendation in response to the iterative drilling simulation achieving the desired optimization, wherein said simulator operates to repeat the specifying of equipment characteristics of at least one drilling system, iteratively simulating the drilling of the well bore, and generating a preliminary recommendation for any additional equipment considerations, wherein said simulator further generates an overall recommendation as a function of the preliminary recommendations of iterative drilling simulations.

54. The system of claim 53, wherein the overall recommendation package comprises at least one of the following selected from the group consisting of hardcopy, CD ROM, computer readable media, electronic file, holographic projection, compressed time animation, and any combination thereof.

55. A system for preparing a recommendation package for enhanced economic decision making in connection with drilling at least one well bore in a given formation, said system comprising:

first input for obtaining geology characteristics of the formation to be drilled, the geology characteristics including at least a rock column;

second input for specifying equipment characteristics of at least one drilling system, the equipment characteristics including drilling mechanics parameters; and a simulator for simulating the drilling of the well bore in the formation, wherein the drilling simulation is a function of the geology and drilling system equipment characteristics according to a drilling simulation model, said simulator further for generating an economic evaluation factor as a function of the drilling simulation, wherein said simulator operates to iteratively repeat, for any additional equipment considerations, the specifying of equipment characteristics, simulating the drilling of the well bore, and generating the economic evaluation factor, wherein said simulator further generates a recommendation package of the iterative drilling simulations as a function of economic evaluation factors of select ones of respective iterative drilling simulations.

56. The system of claim 55, wherein the recommendation package comprises at least one of the following selected from the group consisting of hardcopy, CD ROM, computer readable media, electronic file, holographic projection, compressed time animation, and any combination thereof.

57. A simulator for enhanced economic decision making in connection with drilling at least one well bore in a given formation, said simulator comprising:
- a first processor, responsive to geology characteristics of the formation to be drilled and specified equipment characteristics of at least one drilling system, for iteratively simulating the drilling of the well bore in the formation, said first processor for producing an economic evaluation factor for each respective iterative drilling simulation and for modifying drilling mechanics parameters until a desired optimization of the iterative drilling simulation is achieved, wherein each iterative drilling simulation is a function of the geology and drilling system equipment characteristics according to a drilling simulation model;
- a second processor, responsive to the achievement of the desired optimization by said first processor, for generating a preliminary recommendation, wherein said first and second processors further operate in response to the geology characteristic and any additional specified equipment characteristics of the at least one drilling system for iteratively simulating the drilling of the well bore and generating a preliminary recommendation for any such additional equipment considerations; and
- a third processor for generating an overall recommendation as a function of the preliminary recommendations of iterative drilling simulations, wherein the geology characteristics include at least a rock column and the equipment characteristics include the drilling mechanics parameters.

58. The simulator of claim 57, wherein the overall recommendation package comprises at least one of the following selected from the group consisting of hardcopy, CD ROM, computer readable media, electronic file, holographic projection, compressed time animation, and any combination thereof.

59. A simulator for enhanced economic decision making in connection with drilling at least one well bore in a given formation, said simulator comprising:
- first input for obtaining geology characteristics of the formation to be drilled, the geology characteristics including at least a rock column;
- second input for specifying equipment characteristics of at least one drilling system, the equipment characteristics including drilling mechanics parameters;
- a first processor, responsive to geology characteristics of the formation to be drilled and specified equipment characteristics of at least one drilling system, for simulating the drilling of the well bore in the formation, wherein the drilling simulation is a function of the geology and drilling system equipment characteristics according to a drilling simulation model;
- a second processor for generating an economic evaluation factor as a function of the drilling simulation, wherein said first and second processors operate to iteratively repeat, in response to any additional equipment considerations of specified equipment characteristics, the simulating of the drilling of the well bore and generating of the economic evaluation factor; and
- a third processor for generating a recommendation package of the iterative drilling simulations as a function of economic evaluation factors of select ones of respective iterative drilling simulations.

60. The simulator of claim 59, wherein the recommendation package comprises at least one of the following selected from the group consisting of hardcopy, CD ROM, computer readable media, electronic file, holographic projection, compressed time animation, and any combination thereof.

* * * * *